(12) United States Patent
Haprian et al.

(10) Patent No.: US 11,392,624 B2
(45) Date of Patent: *Jul. 19, 2022

(54) HYBRID IN-MEMORY BFS-DFS APPROACH FOR COMPUTING GRAPH QUERIES AGAINST HOMOGENEOUS GRAPHS INSIDE RELATIONAL DATABASE SYSTEMS

(71) Applicant: Oracle International Corporation, Redwood Shores, CA (US)

(72) Inventors: Vlad Haprian, Zürich (CH); Laurent Daynes, Saint-Ismier (FR); Shasank K. Chavan, Menlo Park, CA (US); Jean-Pierre Lozi, Zürich (CH); Vasileios Trigonakis, San Jose, CA (US); Sungpack Hong, Palo Alto, CA (US); Marco Arnaboldi, Zürich (CH); Ciprian Baetu, Zürich (CH)

(73) Assignee: Oracle International Corporation, Redwood Shores, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/710,740

(22) Filed: Dec. 11, 2019

(65) Prior Publication Data
US 2021/0182316 A1 Jun. 17, 2021

(51) Int. Cl.
*G06F 16/901* (2019.01)
*G06F 16/28* (2019.01)
*G06F 16/242* (2019.01)
*G06F 16/22* (2019.01)

(52) U.S. Cl.
CPC ........ *G06F 16/285* (2019.01); *G06F 16/2246* (2019.01); *G06F 16/242* (2019.01); *G06F 16/9024* (2019.01)

(58) Field of Classification Search
CPC ............... G06F 16/285; G06F 16/9024; G06F 16/2246; G06F 16/242; G06F 16/9027
See application file for complete search history.

(56) References Cited

U.S. PATENT DOCUMENTS

| | | | |
|---|---|---|---|
| 6,216,132 B1 | 4/2001 | Chandra | |
| 6,421,663 B1 | 7/2002 | Chen et al. | |
| 8,234,233 B2 | 7/2012 | Zhou | |
| 8,316,060 B1* | 11/2012 | Snyder, II | G06F 16/9024 707/797 |
| 8,543,517 B2 | 9/2013 | Shotton | |
| 9,135,565 B1 | 9/2015 | Khalefa | |

(Continued)

OTHER PUBLICATIONS

Zhang et al., "REGTT: Accelerating Tree Traversals on GPUs by Exploiting Regularities", dated 2016, 10 pages.

(Continued)

*Primary Examiner* — Amresh Singh
(74) *Attorney, Agent, or Firm* — Hickman Becker Bingham Ledesma LLP

(57) ABSTRACT

An in-memory graph query runtime is integrated inside a database management system and is capable of performing simple patter-matching queries against homogeneous graphs. The runtime efficiently combines breadth-first (BFS) and depth-first (DFS) neighbor traversal algorithms to achieve a hybrid runtime that takes the best from both sides. As a result, the hybrid runtime is able to process arbitrarily large queries with a fixed amount of memory, optimizing for memory locality.

20 Claims, 25 Drawing Sheets

Graph

Target Pattern

(56) References Cited

U.S. PATENT DOCUMENTS

| | | |
|---|---|---|
| 2002/0041705 A1 | 4/2002 | Lin |
| 2004/0133747 A1 | 7/2004 | Coldewey |
| 2005/0015511 A1 | 1/2005 | Izmailov |
| 2007/0043347 A1 | 2/2007 | Solomita |
| 2008/0153444 A1 | 6/2008 | Chen |
| 2012/0109889 A1 | 5/2012 | Wu |
| 2015/0261817 A1 | 9/2015 | Harris |
| 2016/0071233 A1* | 3/2016 | Macko .................. G06T 11/206 345/440 |
| 2016/0306896 A1 | 10/2016 | Paradies |
| 2017/0031976 A1 | 2/2017 | Chavan et al. |
| 2017/0060958 A1* | 3/2017 | Van Rest ............ G06F 16/9024 |
| 2017/0091246 A1 | 3/2017 | Risvik |
| 2017/0118042 A1 | 4/2017 | Bhattacharya |
| 2017/0169133 A1 | 6/2017 | Kim |
| 2018/0203897 A1* | 7/2018 | Van Rest ............ G06F 16/9024 |
| 2018/0329958 A1 | 11/2018 | Choudhury |
| 2019/0325076 A1 | 10/2019 | Haglin |
| 2020/0242167 A1 | 7/2020 | Broecheler |
| 2020/0265049 A1 | 8/2020 | da Trindade et al. |
| 2021/0034615 A1 | 2/2021 | Chen et al. |
| 2021/0089580 A1 | 3/2021 | Deng |
| 2021/0182285 A1 | 6/2021 | Haprian |
| 2021/0182315 A1 | 6/2021 | Haprian |
| 2021/0240705 A1 | 8/2021 | Trigonakis |
| 2022/0114178 A1 | 4/2022 | Haprian et al. |

OTHER PUBLICATIONS

Priya et al., "A Survey on Realizing Memory-Optimized Distributed Graph Processing", IOSR Journal of Engineering (IOSRJEN), vol. 8, Issue 8 dated Aug. 2018, 7 pages.

Lyu et al., "DBL: Reachability Queries on Dynamic Graphs", Technical Report, dated Jan. 4, 2019, 27 pages.

Dekel et al., "Cachesensitive Optimization of Immutable Graph Taversals (CS745 Project Report)", ACM, dated 2015, 9 pages.

Cong et al., "Solving Large, Irregular Graph Problems using Adaptive Work-stealing", dated 2008, 10 pages.

PGQL, Property Graph Query Language, http://pgql-lang.org/, last viewed on Dec. 11, 2019, 5 pages.

Neo4j Graph Platform, https://neo4j.com/, last viewed on Dec. 11, 2019, 11 pages.

Databricks, Graph Analysis Tutorial with GraphFrames, https://docs.databricks.com/spark/latest/graph-analysis/graphframes/graph-analysis-tutorial.html, last viewed on Dec. 11, 2019, 3 pages.

Cypher Query Language Developer Guides and Tutorials, Developer Guides, https://neo4j.com/developer/cypher/, last viewed on Dec. 11, 2019, 5 pages.

Apache TinkerPop, The Germlin Grpah Traversal Machine and Language, http://tinkerpop.apache.org/gremlin.html, last viewed on Dec. 11, 2019, 6 pages.

Amazon Neptune—Fast, Reliable Graph Database Built for the Cloud, https://aws.amazon.com/neptune/, last viewed on Dec. 11, 2019, 16 pages.

Trigonakis, U.S. Appl. No. 16/778,668, filed Jan. 31, 2020, Final Rejection, dated Oct. 1, 2021.

Haprian, U.S. Appl. No. 16/710,715, filed Dec. 11, 2019, Non-Final Rejection, dated Nov. 9, 2021.

Ma et al., "G-SQL: Fast Query Processing via Graph Exploration", Proceedings of the VLDB Endowment, vol. 9, No. 12, DOI: 2150-8097/16/08, dated 2016, 12 pages.

Azure Cosmos DB, "Fast NoSQL Database with Open APIs for any Scale", https://azure.microsoft.com/en-gb/services/cosmos-db, dated 2018, 20 pages.

Boncz et al., Breaking the Memory Wall in MonetDB, Communications of the ACM, vol. 15, No. 12, dated Dec. 2008, 9 pages.

Buleon, "OrientDB—The Multi-Model and Graph Database", Info-H-415: Advanced Databases, http://orientdb.com/docs/last/index.html, dated 2017, 20 pages.

Chen et al., G-Minor: An Efficient Task-Oriented Graph Mining System , EuroSys 2018, Association for Computing Machinery, https://doi.org/10.1145/3190508.3190545, dated Apr. 2018, 12 pages.

Dave et al., GraphFrames: An Integrated API for Mixing Graph and Relational Queries, GRADES 2016, DOI: http://dx.doi.org/10.1145/2960414.2960416, dated Jun. 2016, 8 pages.

David et al., "Asynchronized Concurrency: The Secret to Scaling Concurrent Search Data Structures", ASPLOS 2015, http://dx.doi.org/10.1145/2694344.2694359, dated Mar. 2015, 14 pages.

Dubey et al., "Weaver: A High-Performance, Transactional Graph Database Based on Refinable Timestamps", Proceedings of the VLDB Endowmwnt, vol. 9, No. 11, https://arxiv.org/pdf/1509.08443.pdf, dated 2016, 12 pages.

Hong et al., "PGX.D: A Fast Distributed Graph Processing Engine", High Performance Computing, Networking and Storage Conference, SC 2015, DOI: http://dx.org/10.1145/2807591.2807620, dated Nov. 2015, 12 pages.

Iyer et al., "ASAP: Fast, Approximate Graph Pattern Mining at Scale", Proceedings of the 13th USENIX Symposium on Operating Systems Design and Implementation, https://www.usenix.org/conference/osdi18/presentation/iyer, dated Oct. 2018, 18 pages.

Kankanamge et al., "Graphflow: An Active Graph Database", SIGMOD 2017, DOI: http://dx.doi.org/10.1145/3035918.3056445, dated May 2017, 4 pages.

Khandelwal et al., "ZipG: A Memory-Efficient Graph Store for Interactive Queries", SIGMOD 2017, DOI: http://dx.doi.org/10.1145/3035918.3064012, dated May 2017, 16 pages.

Kim et al., "TurboFlux: A Fast Continuous Subgraph Matching System for Streaming Graph Data", SIGMOD 2018, DOI: https://doi.org/10.1145/3183713.3196917, dated Jun. 2018, 16 pages.

Abdelaziz et al.,"Combining Vertex-Centric Graph Processing with SPARQL for Large-Scale RDF Data Analytics", IEEE Transactions on Parallel and Distributed Systems, http://dx.doi.org/10.1109/TPDS.2017.2720174, dated 2017, 15 pages.

Lumsdaine et al., "Challenges in Parallel Graph Processing", World Scientific Publishing Company, Parallel Processing Letters, dated Jan. 2007, 16 pages.

Zaharia et al., "Resilient Distributed Datasets: A Fault-Tolerant Abstraction for In-Memory Cluster Computing", 9th USENIX Symposium on Networked Systems Design and Implementation, dated Apr. 2012, 14 pages.

Microsoft Graph Engine, "Graph Engine: Serving Big Graphs in Real-Time", https://www.graphengine.io, dated 2017, 2 pages.

Müller, "Engineering Aggregation Operations for Relational In-Memory Database Systems", Karlsruhe Institute of Technology, Germany, dated 2016, 197 pages.

Openquery.com, "OQGRAPH Engine for MariaDB", https://openquery.com.au/products/graph-engine, dated Apr. 2008, 4 pages.

Page et al., "The PageRank Citation Ranking: Bringing Order to the Web", http://ilpubs.stanford.edu:8090/422/1/1999-66.pdf, dated Jan. 1998, 17 pages.

Sarwat et al., "Horton+: A Distributed System for Processing Declarative Reachability Queries over Partitioned Graphs", Proceedings of the VLDB Endowment, vol. 6, No. 14, https://dl.acm.org/doi/abs/10.14778/2556549.2556573, dated Aug. 2013, 12 pages.

Shao et al., "Trinity Graph Engine and its Applications", Bulletin of the IEEE Computer Society Technical Committee on Data Engineering, https://www.graphengine.io/downloads/papers/TrinityAndApps.pdf, dated 2017, 12 pages.

Shao et al., "Trinity: A Distributed Graph Engine on a Memory Cloud", SIGMOD 2013, https://dl.acm.org/doi/abs/10.1145/2463676.2467799, dated Jun. 2013, 12 pages.

Sharma, "Dragon: A Distributed Graph Query Engine", Facebook Engineering, https://code.fb.com/datainfrastructure/dragon-a-distributed-graph-query-engine, dated Mar. 2016, 7 pages.

Spyropoulos et al., "Digree: Building A Distributed Graph Processing Engine out of Single-Node Graph Database Installations", SIGMOD Record—vol. 46, No. 4, https://dl.acm.org/doi/abs/10.1145/3186549.3186555, dated 2017, 6 pages.

The Linux Foundation, "JanusGraph", https://docs.janusgraph.org, dated 2020, 3 pages.

(56) References Cited

OTHER PUBLICATIONS

Titan.thinkaurelius.com, Chapter 3: Getting Started, s3.thinkaurelius.com/docs/titan/1.0.0/getting-started.html, dated 2015, 8 pages.

Virtuoso Universal Server, "Data-Driven Agility without Compromise", http://virtuoso.openlinksw.com, dated 2019, 10 pages.

Yan et al., "A General-Purpose Query-Centric Framework for Querying Big Graphs", Proceedings of the VLDB Endowment, vol. 9, No. 7, https://dl.acm.org/doi/abs/10.14778/2904483.2904488, dated 2016, 12 pages.

Labouseur et al., "The G* Graph Database: Efficiently Managing Large Distributed Dynamic Graphs", Springer Science+Business Media, Distrib Parallel Databases, DOI: 10.1007/s10619-014-7140-3, dated Mar. 2014, 36 pages.

Haprian, U.S. Appl. No. 17/162,564, filed Jan. 29, 2021, Non-Final Rejection dated Feb. 3, 2022.

\* cited by examiner

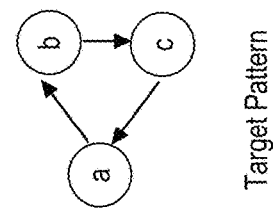
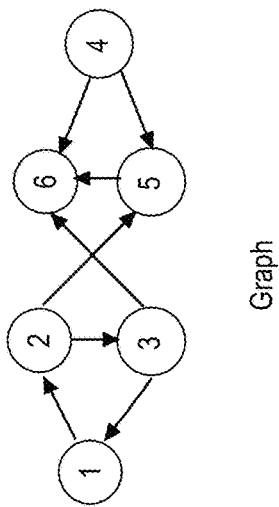
Fig. 1
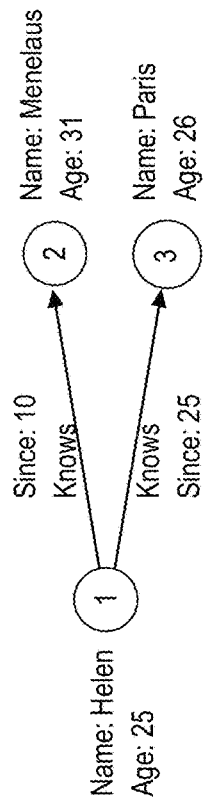
Fig. 2A
Fig. 2B

Fig. 8C
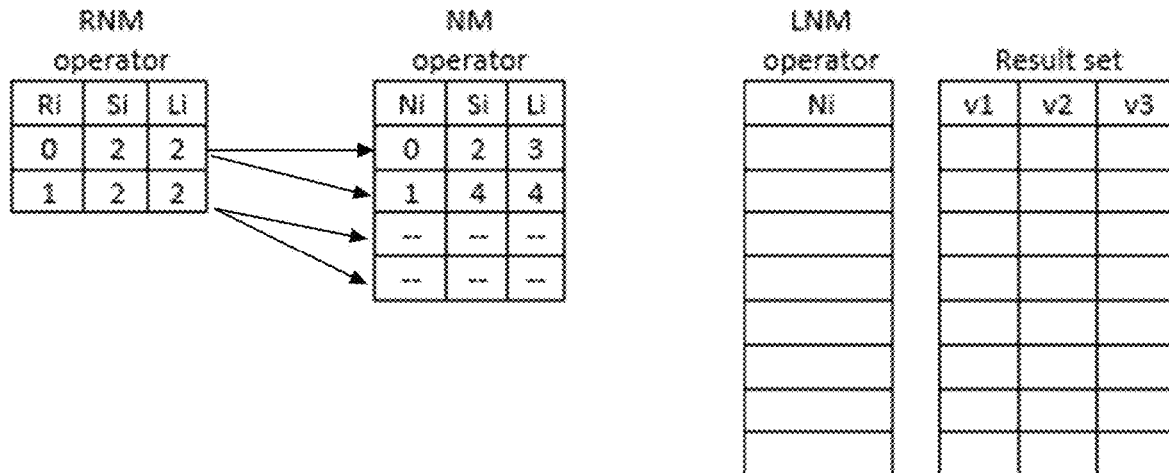
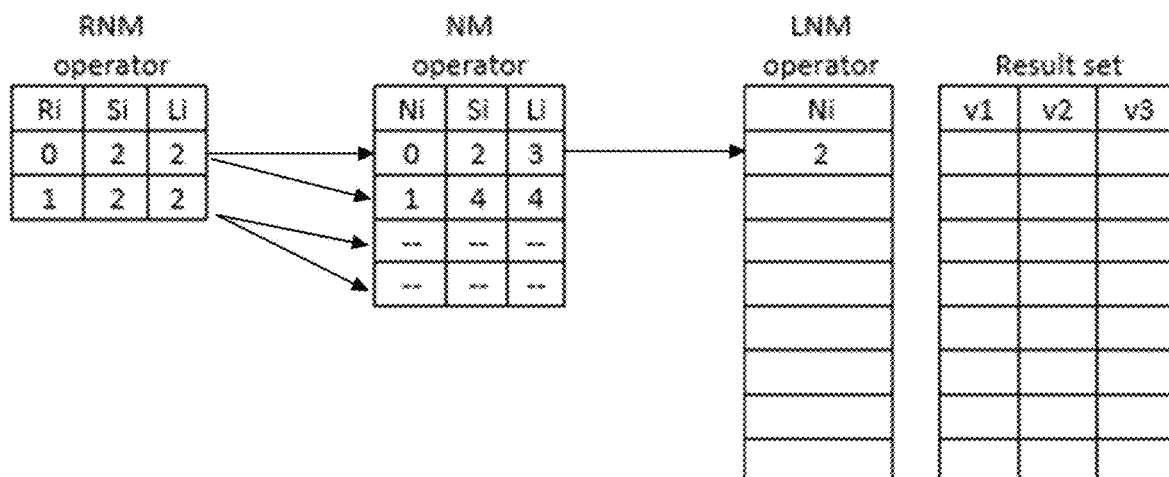
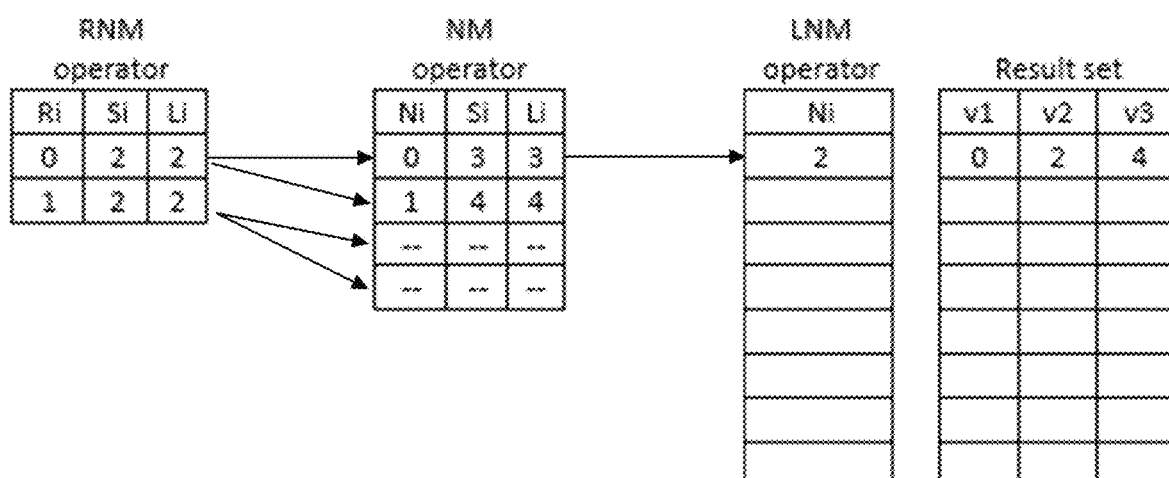

Fig. 8E
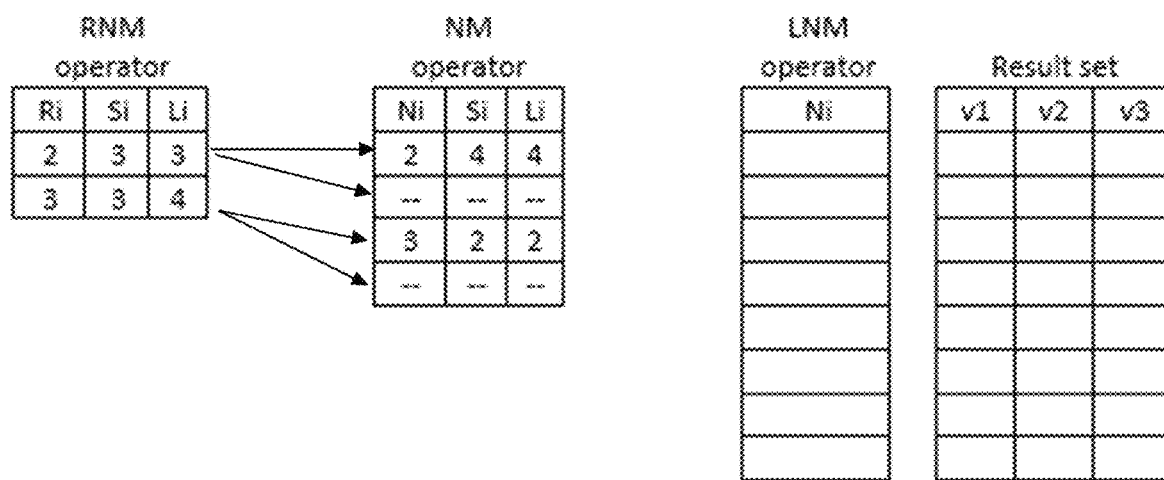
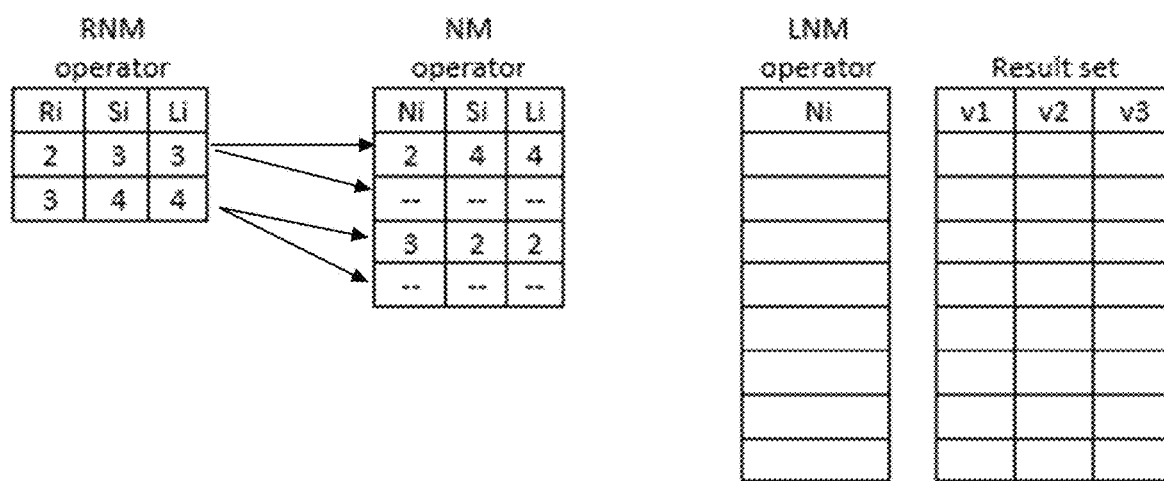

Fig. 8G
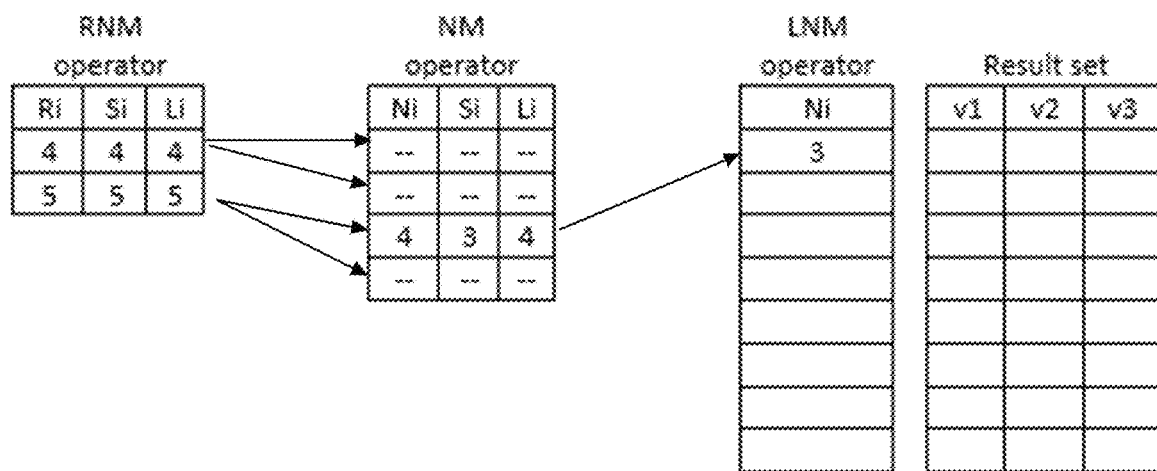
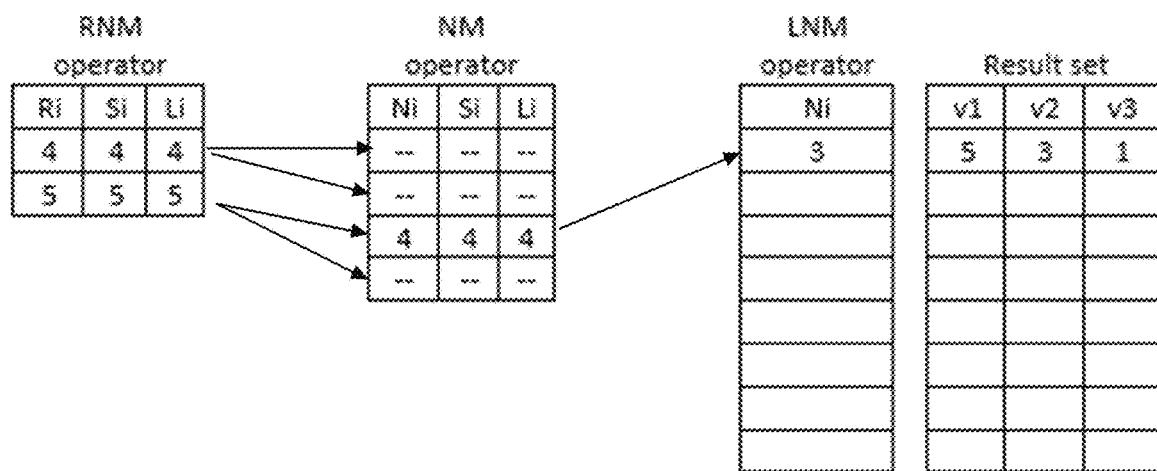

Authors Table

| Vid | Name | Born |
|---|---|---|
| 1 | Rosen | 1909 |
| 2 | Einstein | 1879 |

Papers Table

| Vid | Title | Born |
|---|---|---|
| 3 | On Gravitational Waves | 1937 |
| 4 | The Theory of Relativity | 1911 |

Wrote Table

| Eid | AuthorId | PaperId |
|---|---|---|
| 1 | 1 | 3 |
| 2 | 2 | 3 |
| 3 | 2 | 4 |

Fig. 19

- How to split high degree vertices for which #neighbors > job_size / chunk_size ?

For example:  job_size = 50
Chunk_size = 4
neighbors for Ni 1 = 1000

| Ni | Si | Li | Ei |
|---|---|---|---|
| ... | | | |
| 12 | 0 | 4 | ... |
| ... | | | |

| Ni | Si | Li | Ei |
|---|---|---|---|
| 0 | 0 | 50 | |
| 1 | 50 | 100 | |
| 1 | 100 | 150 | |
| 1 | 150 | 200 | |

Backtrack on internal state flag

One chunk state per chunk is used to remember which neighbors were not completely explored.

When backtrack (and flag is set), use the chunk state to fill the chunk.

| Ni | Si | Li | Ei |
|---|---|---|---|
| ... | | | |
| 12 | 2 | 4 | ... |
| ... | | | |

| Ni | Si | Li | Ei |
|---|---|---|---|
| 0 | 0 | 50 | |
| 1 | 50 | 100 | |
| 1 | 100 | 150 | |
| 1 | 150 | 200 | |

Once chunk state is consumed (c_Li == c_Si), use the parent state to backtrack and unset the flag.

HYBRID IN-MEMORY BFS-DFS APPROACH FOR COMPUTING GRAPH QUERIES AGAINST HOMOGENEOUS GRAPHS INSIDE RELATIONAL DATABASE SYSTEMS

CROSS-REFERENCE TO RELATED APPLICATIONS

This application is related to U.S. patent application Ser. No. 16/710,719, filed Dec. 11, 2019, entitled "Hybrid In-Memory BFS-DFS Approach for Computing Graph Queries against Heterogeneous Graphs inside Relational Database Systems," and U.S. patent application Ser. No. 16/710,715, filed Dec. 11, 2019, entitled "Hybrid In-Memory BFS-DFS Approach for Computing Graph Queries Involving Complex Path Patterns Including Trees and Cycles inside Relational Database Systems," wherein the entire contents of which are hereby incorporated by reference as if fully set forth herein.

FIELD OF THE INVENTION

The present disclosure relates to techniques for graph searches. More specifically, the disclosure relates to a hybrid in-memory BFS-DFS approach for computing graph queries inside relational database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graph processing is an important tool for data analytics. Relational DBMSs increasingly allow their users to define property graph from relational tables and to query them using graph pattern matching queries. Most products limit users to define a graph out of a single vertex table and edge table (e.g., Microsoft SQL Server, SAP Hana). These graphs are called homogeneous graphs. The most advanced systems may define a graph out of multiple vertex and edge tables. For example, a heterogeneous graph may be created out of the existing tables in a database by mapping every dimension table to a vertex table and every fact table to an edge table. The only constraint is that vertex tables should have a primary key column and the edge tables should associate foreign keys corresponding to the primary keys into two different/same vertex tables.

Graph querying and pattern matching enables interactive exploration of graphs, similar to how SQL interacts with databases. Pattern matching refers to finding patterns in the graph that are homomorphic to a target pattern, such as a triangle. In addition to the structural pattern, the user can add projections, filters, etc., similar to SQL.

Graph queries, which refer to "graph querying and pattern matching," are a very challenging workload as they put the focus on edges, i.e., the connections in the data. Therefore, executing graph queries might explore immense amounts of intermediate results and queries can quickly explode in terms of memory usage. Additionally, graph queries exhibit very irregular access patterns with limited memory locality, as the query patterns and the connections in the data dictate the accesses.

One way that relational DBMSs implement graph queries is by translating the graph query into an SQL join query and processing it with their existing SQL engine. This approach is suboptimal in two ways.

In the case of homogeneous graphs, SQL engines do not leverage the graph structure when doing neighbor traversals. In other words, when iterating over the neighbors of a vertex V, a join operator will have to scan through all possible vertices and check if they are connected to vertex V. More advanced join operators may use a hash-join operation that will build in memory a hash table from the smallest of the table and, then, probe that table for matching element when scanning the largest table once. As such, the "neighbor" scan is often not performed. However, the construction of the hash table is repeatedly performed for every join in the query and for every query.

In the case of heterogeneous graphs, most SQL engines do not take advantage of sharing computation on common overlapping prefixes across paths belonging to multiple instantiations of a given path pattern.

Most of the existing specialized graph processing engines leverage the graph structure encoded in the data and use one of the two main traversal approaches when dealing with graph queries: breath-first traversal (BFS) and depth-first traversal (DFS). In BFS, all the vertices at a given level are matched before processing the next level. In DFS, a vertex at one level is processed at one level before going to the next level. Once the whole pattern is matched, the path is backtracked to iterate over more vertices.

These traversal techniques are not directly suitable for being integrated into a relational database systems for several reasons. First, most query execution plan operators ("plan operator") work in a pipeline. As soon as a plan operator produces a set of tuples, it sends them to the next plan operator in order to be processed to materialize the whole result before going able to go to the next pipeline stage. From this point of view, the graph processing runtime should be pipeline friendly and the results should be produced as fast as possible. BFS execution mode would not satisfy this as it needs to produce all the results before being able to ship them to the next plan operator.

In addition, as databases are deployed in multi-user scenarios, memory footprint of every query is essential for maximizing the number of concurrent clients. Thus, the graph processing runtime should have a low memory footprint. BFS execution mode would not satisfy this as it materializes all intermediate results, possibly monopolizing the memory of the machine.

These problems could be solved by using a DFS exploration approach, which produces results as soon as the first path is matched and has a very small memory footprint. However, the issue with DFS exploration is that it breaks locality when iterating over neighbors as it looks only at a single neighbor at a time.

Therefore, there is a need for a solution to address these challenges found inside a single machine relational database system when processing graph queries.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 1 illustrates an example graph and an example target pattern.

FIG. 2A illustrates an example property graph.

FIG. 2B illustrates example tables associated with the graph of FIG. 2A.

FIGS. 8B-8G illustrate the state of match operators during each iteration.

FIG. 19 illustrates a parallel execution example.

DETAILED DESCRIPTION

Figure 3:
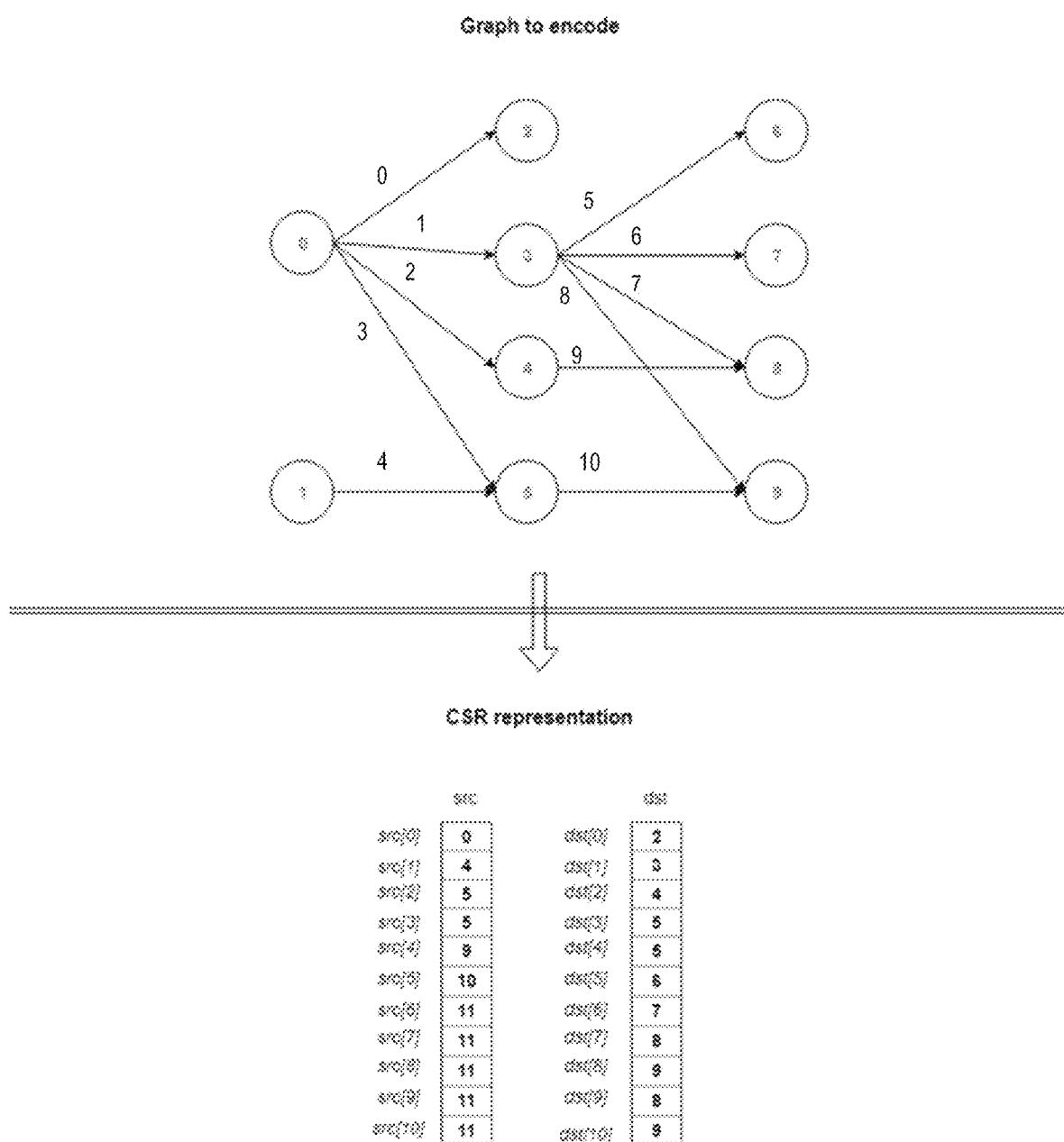
FIG. 3 illustrates an example graph and a corresponding CSR representation thereof.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An in-memory graph query runtime is integrated inside a database management system (DBMS) and is capable of performing pattern-matching queries against graphs of different complexities. The runtime efficiently combines breadth-first (BFS) and depth-first (DFS) neighbor traversal algorithms to achieve a hybrid runtime that takes the best from both algorithms. As a result, the hybrid runtime is able to process arbitrarily large queries with a fixed amount of memory, optimizing for memory locality. A tremendous advantage of being integrated in the relational database is that the runtime can be pipelined with the rest of already-existing operators. Another advantage is that data need not be exported from databases in external engines in order to execute graph queries.

Background in Graph Processing Systems

A graph is a mathematical structure used to model relationships between entities. A graph consists of a set of vertices (corresponding to entities) and a set of edges (corresponding to relationships). When data for a specific application has many relevant relationships, the data may be represented by a graph.

Graph processing systems can be split in two classes: graph analytics and graph querying. Graph analytics systems have a goal of extracting information hidden in the relationships between entities, by iteratively traversing relevant subgraphs or the entire graph. Graph querying systems have a different goal of extracting structural information from the data, by matching patterns on the graph topology.

Background in Graph Pattern Matching

Graph pattern matching refers to finding subgraphs, in a given directed graph, that are homomorphic to a target pattern. FIG. 1 illustrates an example graph and an example target pattern. If the target pattern is (a)→(b)→(c)→(a), then corresponding graph walks or paths of FIG. 1 are the following:

(1)→(2)→(3)→(1),
(2)→(3)→(1)→(2), and
(3)→(1)→(2)→(3).

One hop corresponds to a graph walk consisting of a single edge. A walk with n edges is considered as a n-hop pattern.

As discussed above, three approaches may be used for performing pattern matching in graph systems. A first approach includes operations similar to JOINs in relational DBMSs. To match a hop in the pattern, the system performs a JOIN with the previous intermediate results. The disadvantage of this approach is that it does not exploit the graph structure by iterating only over the neighbors of a node but iterates over all possible nodes when performing the JOIN.

A second approach is a BFS neighbor traversal. This approach generates all the matches for all possible pattern prefixes, starting from one single node until reaching the desired pattern. This algorithm works in an iterative manner: having all the matches for a prefix pattern, it computes all the matches for the prefix extended with an extra hop. The advantage over the first approach is that the system keeps track of the neighbors of each node and performs a scan only over the neighbors of a node when it is needed. However, it still has the disadvantage of possibly using a big amount of memory for the intermediate results.

A third approach is a DFS neighbor traversal. With this approach, the system matches full paths and does not generate intermediate results. This algorithm does not need to store all the matches for each pattern prefixes but has the drawback in that it does not optimize for memory locality while traversing over the neighbors of each node because only one node neighbor is considered at each step.

Embodiments of the present invention relate to a hybrid traversal to perform pattern matching. The hybrid traversal is similar to the BFS neighbor traversal, but the hybrid traversal only explores a limited number of neighbors in one iteration, following to resume later to process the remaining neighbors. This algorithm has the advantage in that it optimizes for memory locality by processing several neighbors in one iteration, while still restricting the used memory by limiting the number of neighbors processed at a specific step.

Integrating Graph and Relational Databases

Techniques, described herein, use RAM memory only for storing a graph topology and keep the rest of the data on disk. In particular, the techniques use the in-memory acceleration for graph traversals, without storing redundant data in memory. Additionally, techniques use existing database tables as vertex or edge tables and can process different types of graphs, including homogeneous graphs and heterogeneous graphs.

Translation from Relational Model to Property Graph Model

A property graph data model allows vertices and edges in a graph to have arbitrary properties as key-value pairs. FIG. 2A illustrates an example property graph. The property graph in FIG. 2A represents contact relationships between persons. The persons have name and age properties, while the relationships have a property indicting the age at which the subject knew the other person.

Conceptually, a relational DBMS may be interpreted in a graph model. For example, all vertices and their properties may be grouped in a vertex table, while all relationships and their properties may be grouped in an edge table. As an example, the graph illustrated in FIG. 2A may be stored in a RDBMS as tables, as illustrated FIG. 2B. Each vertex has a unique identifier (i.e., Vid) in the vertex table (i.e., Persons Table) where it is stored. Similarly, each edge has a unique identifier (i.e., Eid) in the edge table (i.e., Knows Table) where it is stored. The edge table can be used for matching patterns; the vertex and edge tables can then be used for accessing the desired information when the pattern is matched. The RDBMS keeps track of the referenced tables by each edge table, in order to be able to reconstruct the graph structure.

Representing Graphs in Memory

In an embodiment, a graph may be represented by compressed sparse rows (CSR). This representation may be the most useful in graph processing engines because of its compact size and its neighbor caching behavior. The CSR compression is performed over the adjacency matrix of the graph.

The CSR representation for a graph G with n vertices labeled from 0 to n−1, and m edges, labeled from 0 to m−1, includes two arrays, src and dst. FIG. 3 illustrates an example graph and a corresponding CSR representation thereof. The graph in FIG. 3 includes 10 vertices and 11 edges.

Each vertex in the graph is associated with a unique identifier allocated from a set of numbers. The unique identifier behaves as the src array index. The vertex id is referred to herein as Vid. The src array will have size n+1. For every $i \in \{0, 1, \ldots, n-1\}$, the value stored in src[i] will be the position in the dst array for the first neighbor of vertex i. The last position of src array stores the value m, i.e., src[n]=m.

Similarly, each edge in the graph is associated with a unique identifier that behaves as the dst array index. The edge identifier is referred to herein as Ni (neighbor index). The dst array will have size m. For every $i \in \{0, 1, \ldots, n-1\}$, the neighbors of vertex i are stored at the positions between src[i] and src[i+1], meaning that all the neighbors of a vertex are stored consequently, which helps while traversing all the neighbors of a specific vertex.

As an illustration, in the example of FIG. 3, to find the first neighbor of vertex 1, the value at src array index 1 of the src array (e.g., src[1]) is obtained. The value at src[1], which is four (4), identifies edge 4 as being the first edge from vertex 1. Referring to dst array, the value at dst array index 4 of the dst array (e.g., dst[4]) is then obtained. The value dst[4], which is five (5), identifies vertex 5 as being the vertex from edge 4. Accordingly, vertex 5 is the first neighbor of vertex 1.

Also, as an illustration, in the example of FIG. 3, to find all neighbors of vertex 3, the value at src array index 3 and the value at scr array index 4 of the scr array (e.g., scr[3] and scr[4]) are obtained. The difference between the two values at scr[3], which is five (5), and at scr[4], which is nine (9), indicates the number of neighbors vertex 3 has. In this illustration, vertex 3 has a total of four (4) neighbors. The value at scr[3] identifies edge 5 as being the first edge from vertex 3. Referring to dst array, four (4) values starting at dst array index 5 to dst array index 8 of the dst array (e.g., dst[5], dst[6], dst[7], and dst[8]) are then obtained. The values at dst[5] to dst[8], which are six (6) to nine (9), identifies vertex 6 to vertex 9 as being vertices from edges 5 to 8. Accordingly, vertex 6 to vertex 9 are the four (4) neighbors of vertex 3.

Since the source vertex for edges that have the same source is stored once, the CSR representation uses about half the space needed by representations operating on edge lists. Thus, CSR encoding is a good candidate for in-memory graph representations because of the small memory footprint required. In addition, by storing all the neighbors of a vertex in consecutive memory locations, it is a strong fit for tasks which need to iteratively process a vertex's neighbors, such as pattern matching or graph algorithms.

In-Memory Graph Query Runtime

In an embodiment, an in-memory graph query runtime may be integrated inside a RDBMS to improve efficiency of graph queries. The query runtime may be a simplified version of an execution engine that includes a set of operators, a set of data structures that hold corresponding states and execution mode, including control flow (e.g., how the operators call each other), and data flow (e.g., how data flows between the operators). The runtime has access to a CSR that is in memory for optimizing a graph pattern matching operation and to graph properties that are on disk for reducing memory consumption. In an embodiment, the graph query runtime supports simple path expressions, such as line-shaped path patterns (e.g., $(a_1) \rightarrow (a_2) \rightarrow \ldots \rightarrow (a_n)$, for any $n \geq 2$).

The graph query runtime is represented in the RDBMS as a graph table operator, which allows pattern matching queries containing filters and projections on graph properties to be written. The graph table operator transforms result of a graph pattern matching operation into a table, which will have the same number of rows as the number of subgraphs matching the pattern.

The graph table operator can be pipelined with other execution plan operators already existing into the database, thus combining pattern matching with SQL-based querying. The result of the graph table operation can therefore be used by other execution plan operators. For example, the result of a graph table operation may be joined with the result of another subquery: SELECT*FROM G GRAPH_TABLE (MATCH (a)→(b) COLUMNS (a.city as takeoff, b.city as landing)) JOIN FAVORITE_HOTELS f ON takeoff=f.city.

The control flow of the graph query runtime is pull-based. The runtime control flow is further discussed elsewhere herein. In an embodiment, a graph table operator is made of a sequence of match operators that each consumes rows from its children in the plan. When used against the CSR, the graph table operation compiles into a physical operator that takes the CSR as input and produces a row-set, which includes a sequence of rows. The term row source may also be used for a physical operator, such as a graph table operator and/or match operator.

Figure 4:
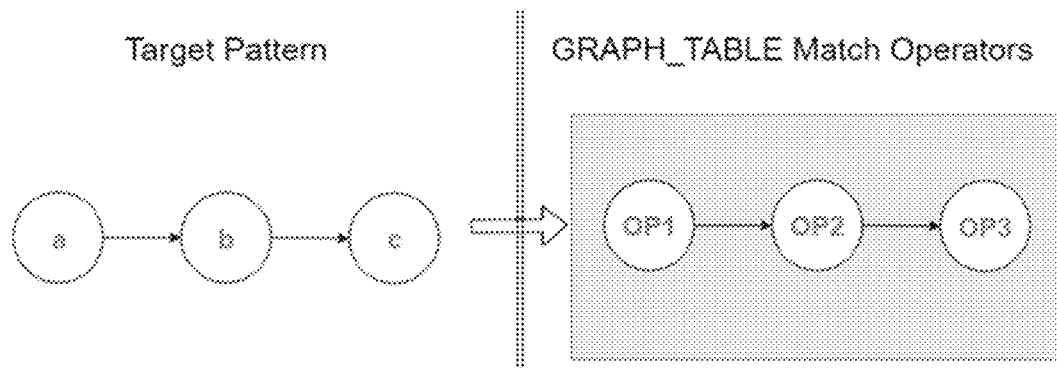
FIG. 4 illustrates an example sequence of match operators.

The graph query runtime uses multiple match operators, one for each vertex or node label in a target pattern to match. The vertex or node may also be referred as a pattern node. The sequence of match operators is isomorphic to the target pattern. FIG. 4 illustrates a sequence of match operators that follows a target pattern of (a)→(b)→(c). In this example, match operator OP1 corresponds to vertex or node (a), match operator OP2 to vertex or node (b), and match operator OP3 corresponds to vertex or node (c).

Top Level Design

A graph table operator computes all paths matching a given target pattern on a given graph and returns a table with number of rows equal to the number of paths matched. The graph table operator includes a sequence of match operators for evaluating a path pattern expression. Each match operator in the sequence of match operators receives as input the result of a previous match operator. Each match operator processes a single hop in a path (e.g., edge to follow+ destination). Each match operator is specialized to a specific task. Assembling match operators into a path pattern expression is performed by a path pattern match compiler during query compilation. The entire path pattern expression produces paths according to the target pattern.

In an embodiment, match operators perform their logic over multiple vertex/edges in a pipelined manner and produce a number of matches that they store in a result set. The first match operator of a path pattern expression always feeds on a CSR and fills a result set that identifies a number of matching vertices. This result set serves as input to the next match operator in the path pattern expression which will produce a set of matching vertices corresponding to that stage (and edges that lead to these vertices). When the last match operator has filled its result set, the graph table operator can then fill its output row-set with entire path match. Once the row-set is filled, control is returned to parent of the graph table operator which then consumes the rows.

Specialized Match Operators

Path pattern match processing with graph table operator is performed using multiple match operators, which are level-specialized, computing units. Each match operator is responsible for computing vertices for a specific hop of a target pattern. In an embodiment, there are three types of match operators.

One type of match operator is a Root Node Match (RNM) operator. The RNM operator is responsible for computing the vertices which match the first or root node of the pattern. The RNM operator finds the first or root level vertices that match the pattern.

Another type of match operator is an Intermediate Neighbor Match (NM) operator. The NM operator will start from a set of input vertices and produces a fixed number of neighbors for each of them. The NM operator is only used for intermediate nodes in the pattern and is not for the first or last node in the pattern. In other words, the NM operator is only used for non-leaf neighbor traversals to find intermediate or non-leaf level vertices that match the pattern.

Yet another type of match operator is a Leaf Neighbor Match (LNM) operator. The LNM operator is similar to the NM operator, but it is only used for matching the last node in the pattern. The LNM operator finds the last or leaf level vertices that match the pattern.

Each type of match operators has a different control flow. All match operators have access to a CSR on which they are run. Each type of match operator has additional specialization, depending on whether a vertex predicate, an edge predicate, or both vertex and edge predicate must be evaluated.

Each match operator is associated with a data structure where it stores the current state, such as the matched vertices by the match operator, the number of valid rows, etc. The control flow enables match operators to move data through the different level data structures and interact with the graph table operator.

Some goals of the data structures include:
avoiding duplicating vertices along a path: For example, if multiple paths start with the same source, the source should be stored only once. In other words, paths are stored in a prefix encoded way that provides memory savings.
providing enough information for path reconstruction: When results are moved to the output row-set, full paths can be reconstructed using the information collected in each match operator in the path pattern expression.
controlling memory footprint: The amount of memory used by each match operator can be tuned.
supporting pipelined execution and memory locality: The number of neighbors explored in one iteration can be limited.

To achieve the last two properties, each data structure represents the state of a match operator in a unique way. In particular, each data structure has columns of size data_size, which is a parameter of the match operator. The value of data_size corresponds with the number of rows in a data structure. Each row of the data structure holds information about one vertex matched in a different path. For root and intermediate data structures, for each vertex stored in the data structures, the runtime will explore chunk_size neighbors, where chunk_size is also a parameter of the match operator. Therefore, the data structure of the next match operator in a path pattern expression will store data_size× chunk_size rows.

Figure 5:
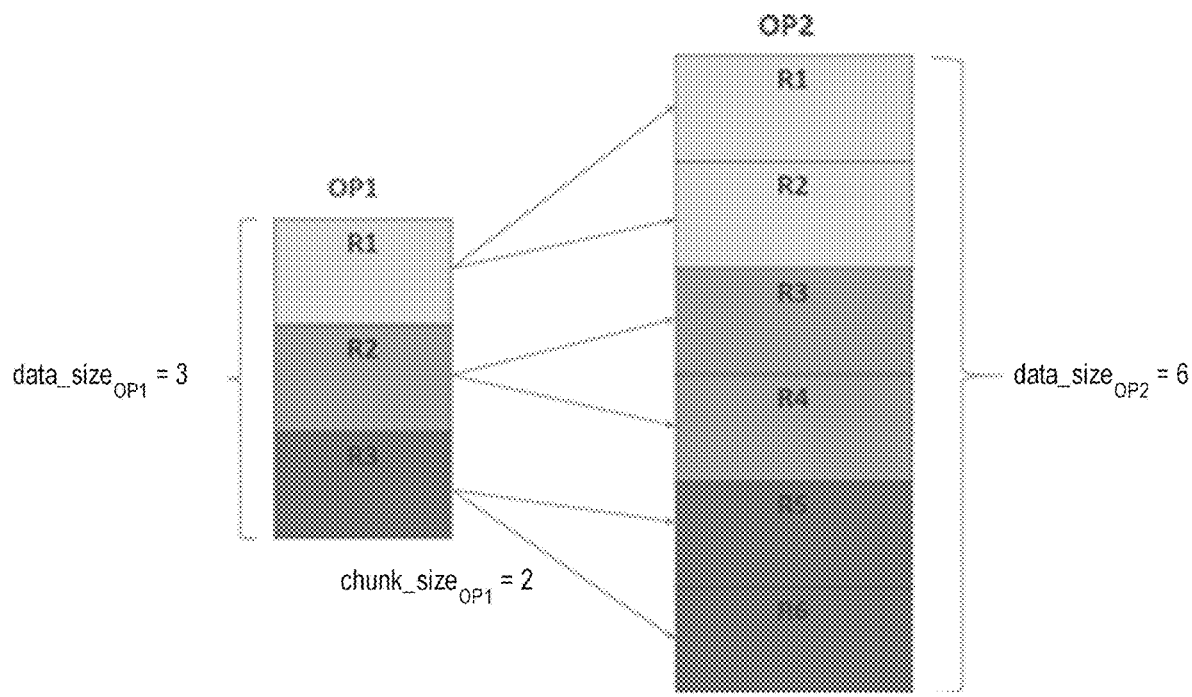
FIG. 5 illustrates example data structures of two consecutive match operators.

FIG. 5 illustrates example data structures of two consecutive match operators. In this example, the data structure corresponding to first operator OP1 stores information for three (3) vertices (e.g., data_size$_{OP1}$=3), and each vertex can process maximum 2 neighbors (e.g., chunk_size$_{OP1}$=2), thus the data structure of the next operator OP2 stores information for six (6) vertices (e.g., data_size$_{OP2}$=6).

In order to compute the pattern matches for a graph, vertices are matched starting at the root node and finishing at the leaf node of the pattern. The first or root match operator—RNM operator—of a path pattern expression uses a CSR and fills its first or root level data structure storing a set of matching vertices. This first or root level data structure acts as input for the next operator (intermediate match operator—NM operator) in the path pattern expression which, using the input and the CSR, computes the vertices matching the path until that point, and stores the results in its intermediate level data structure.

In an embodiment, the pattern matching uses a batch-DFS algorithm, which means that in the process of matching the nodes in the next operator, a limited number of neighbors for each vertex in previous operator is matched.

This process continues until reaching the leaf node of the pattern. After the last or leaf match operator—LNM operator—fills its last or leaf level data structure, the graph table operator returns the matching patterns to the parent operator, which consumes the information.

As discussed above, there are three different match operator types, and each match operator type corresponds with a different data structure to store the state of a match operator. Vertices and edges matched by a match operator are stored in the result set. Each match operator uses a custom result set data structure.

Figure 6:
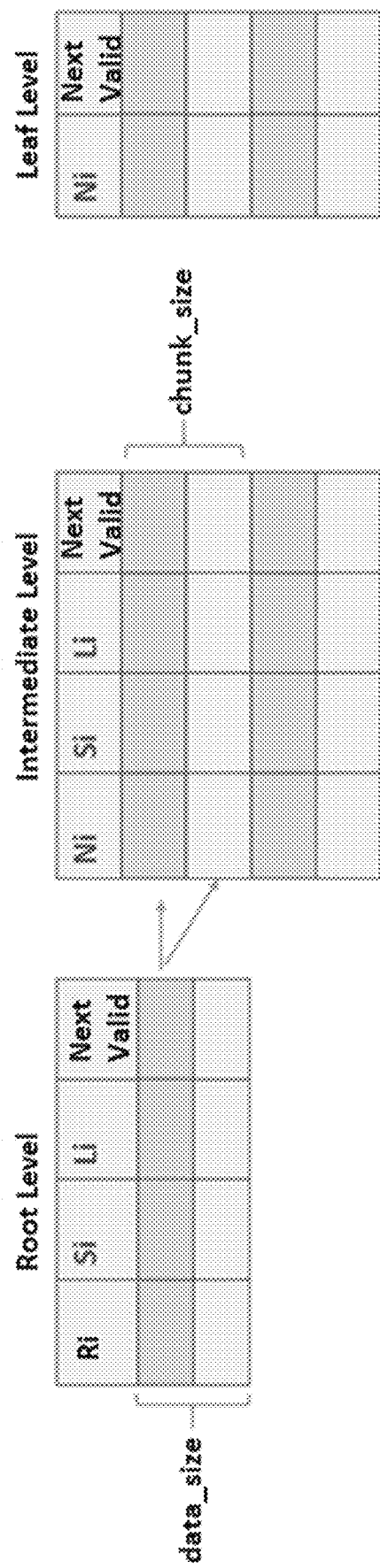
FIG. 6 illustrates example data structures for storing match results of the graph table operator.

FIG. 6 illustrates example data structures for storing match results of the graph table operator. Each of the different data structures is described below.

Root Level Data Structure

The root level data structure stores information about vertices matched by the RNM operator in a plurality of columns, which are treated as arrays during compile time and are referred to as arrays. The root level data structure includes the following arrays: Ri (Root Index) array, Si (Start Index) array, Li (Last Index) array, and Next Valid array, each of them storing on row j.

The Ri array stores the vertex id of the vertices matched by the RNM operator.

The Si array stores the index of the first unprocessed neighbor of Ri[j]. This is the absolute index in the CSR dst array, which allows for fast neighbor information retrieval, such as vertex id or edge id. Si[j] only stores indices of neighbors of Ri[j] in the dst array of the CSR.

The Li array stores the index of the last neighbor of Ri[j]. Like the Si array, it stores absolute indices in the CSR dst array. Li[j] stores the maximum value of Si[j]. When Si[j]=Li[j], it means that all the neighbors for vertex Ri[j] have been processed; as such, the current row can be skipped in the next iteration.

The Next Valid array stores the index k of the next valid row in the data structure. A row k is valid if and only if Si[k]<Li[k], meaning that there are still some neighbors to process for that row. Initially, all rows are marked as invalid.

Intermediate Level Data Structure

The intermediate level data structure stores information about vertices matched by the NM operator in a plurality of columns, which are treated as arrays during compile time and are referred to as arrays. The intermediate level data structure includes the following arrays: Ni (neighbor index) array, Si array, Li array, and Next Valid array. The last three arrays—Si, Li, and Next Valid—are similarly configured as the Si array, Li array, and Next Valid array the root level data structure. The Ri array is replaced by the Ni array.

On row j, the Ni array stores the index in the CSR dst array of the edge matched by this vertex with the corresponding vertex in previous operator. The neighbor/edge index, and not the neighbor id, is stored because edge properties may be used in a filtering or projection phase. In such as case, both vertex and edge properties with the Ni value can be retrieved.

In an embodiment, the decision whether to store the Vid (vertex id) or the Ni information, depending on what the filters or projected columns are, can be taken up at compile time. For example, if a query projects an edge, then neighbor index is stored; otherwise, neighbor id is stored.

Leaf Level Data Structure

The leaf level data structure stores information about vertices matched by the LNM operator in a plurality of columns, which are treated as arrays during compile time and are referred to as arrays. In an embodiment, the leaf level data structure contains only the Ni and Next Valid arrays. Since the leaf match operator does not have a next operator, the Si and Li arrays are undefined. Similar to the intermediate level, the Ni array can be replaced with a Neighbor Id array if no information from the edge leading to the last vertex of the path pattern is needed (e.g., no edge predicate, or no projection of any properties of that edge).

Example Match Operators Graph

Figure 7:
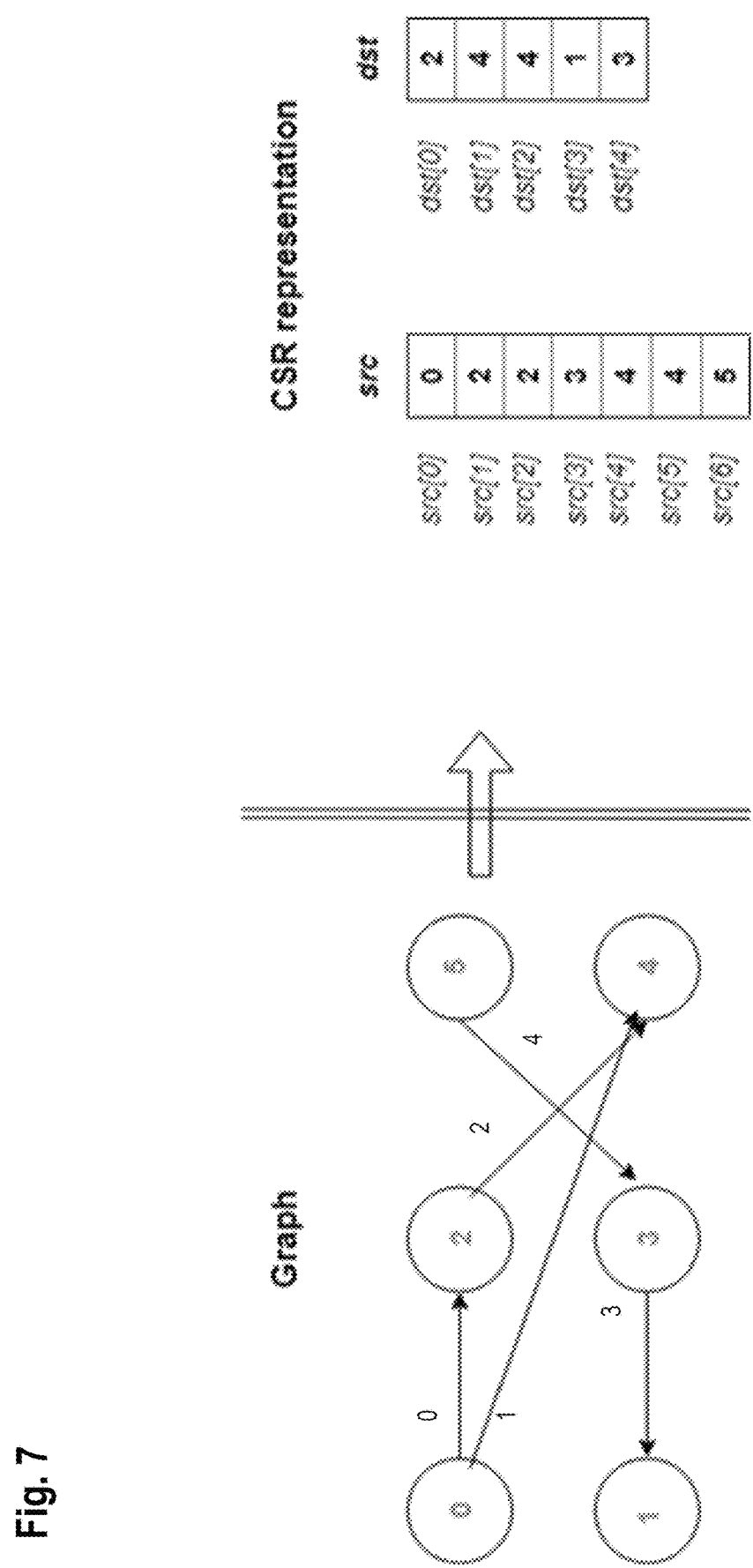
FIG. 7 illustrates another example graph and corresponding CSR representation thereof.

FIG. 7 illustrates another example graph and corresponding CSR representation thereof. In FIG. 7, a direct graph is shown on the left and its corresponding CSR representation is shown on the right. Assume the target pattern to match is (a)→(b)→(c). In that case, considering FIG. 4, the graph table operator will consist of three match operators: one RNM operator, one NM operator, and one LNM operator. The paths in FIG. 7 matching the target pattern include:
(0)→(2)→(4), and
(5)→(3)→(1).

Figure 8A:
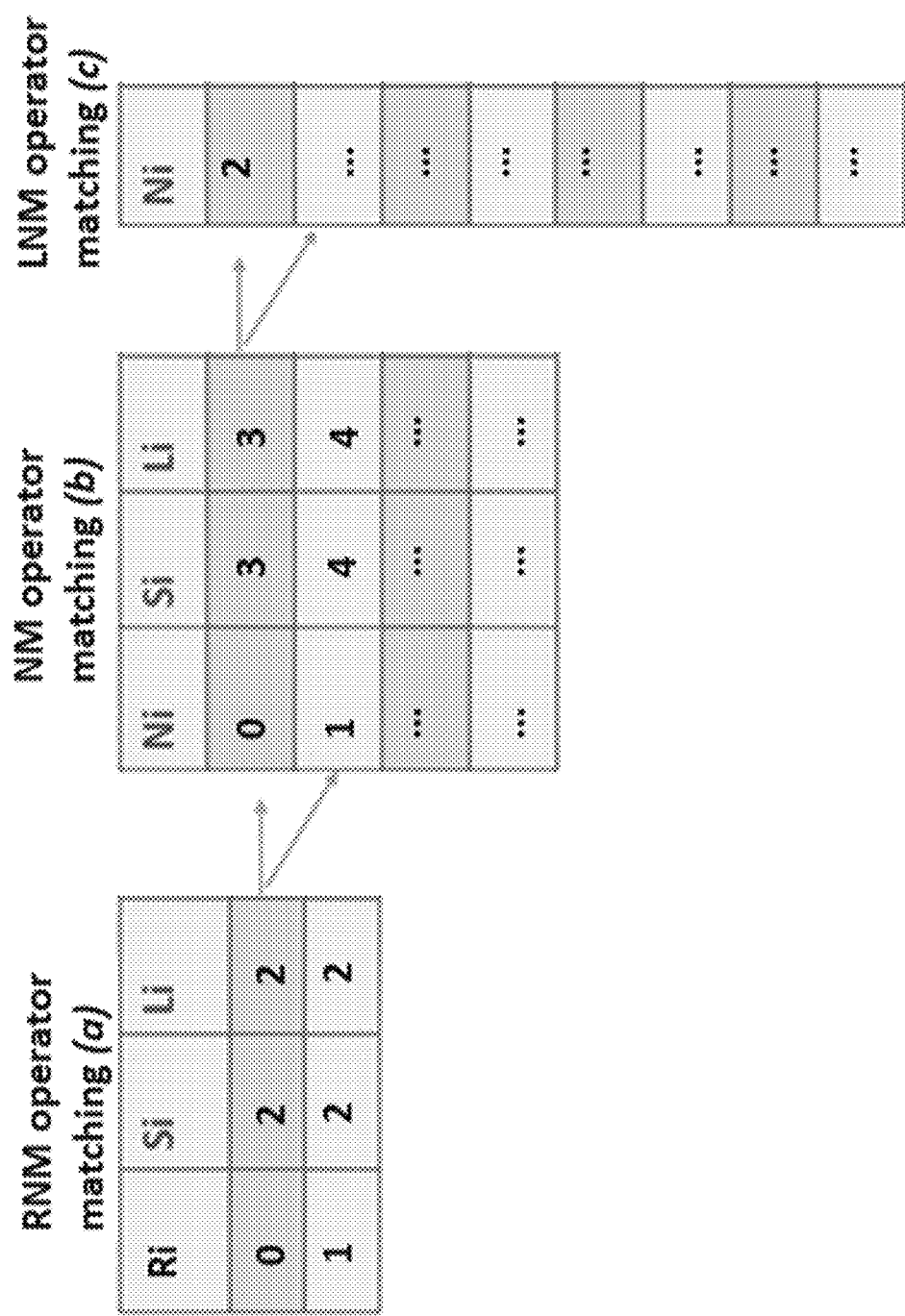
FIG. 8A illustrates the state of match operators after one iteration.

FIG. 8A illustrates the state of match operators after one iteration. The RNM operator is for matching (a). The NM operator is for matching (b). The LNM operator is for matching (c). The Next Valid arrays of the data structures are not shown for purposes of clarity and simplicity. A result set includes the path comprising vertex 0 (e.g., src[0]), vertex 2 (e.g., dst[0]), and vertex 4 (e.g., dst[2]) after this first iteration of the NM operator having no more valid rows in its data structure to be processed and before accessing the RNM operator for more data. As can been seen, the path in the result set corresponds to the first path determined above.

Figure 8B:
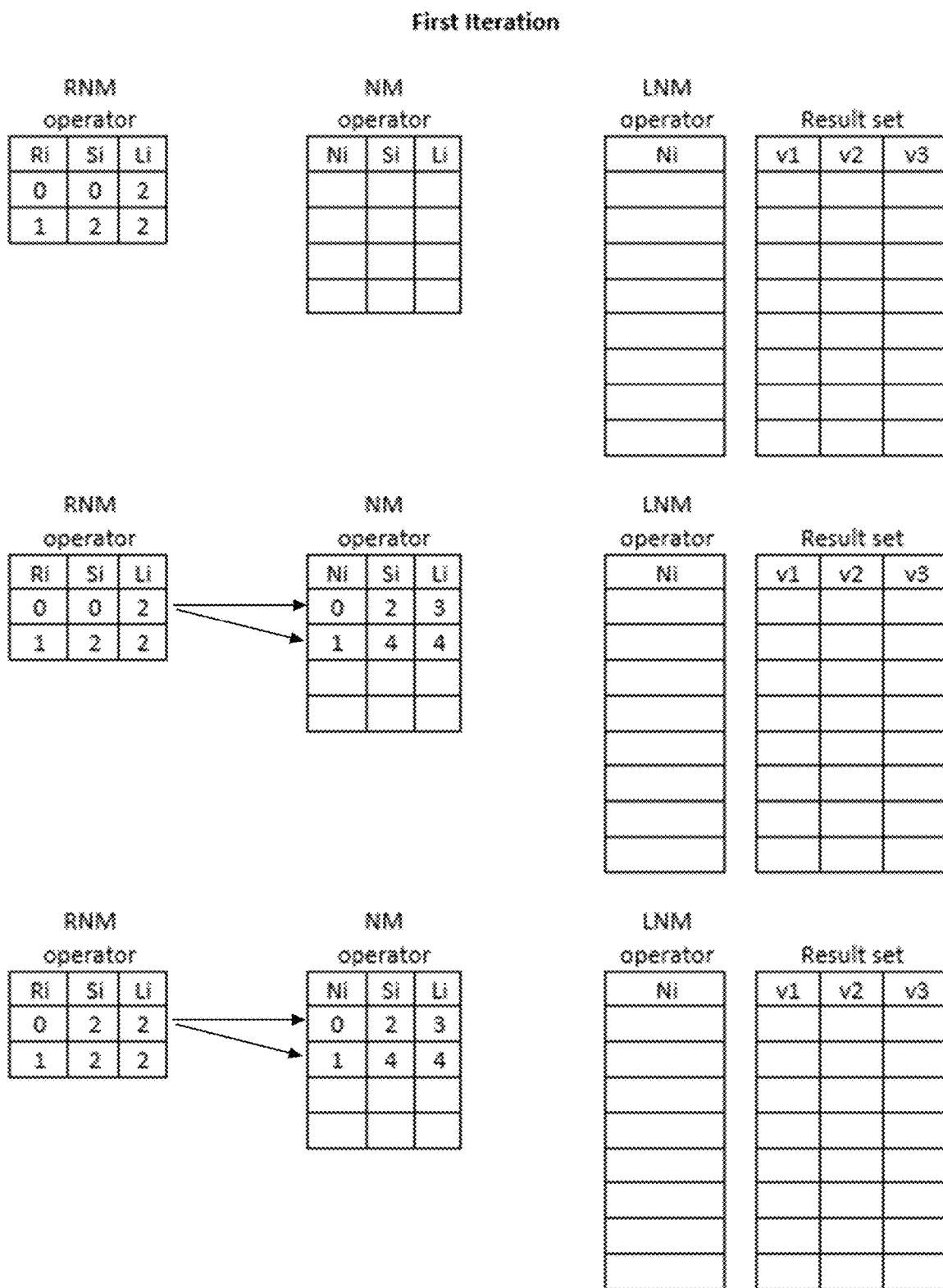
Figure 8D:
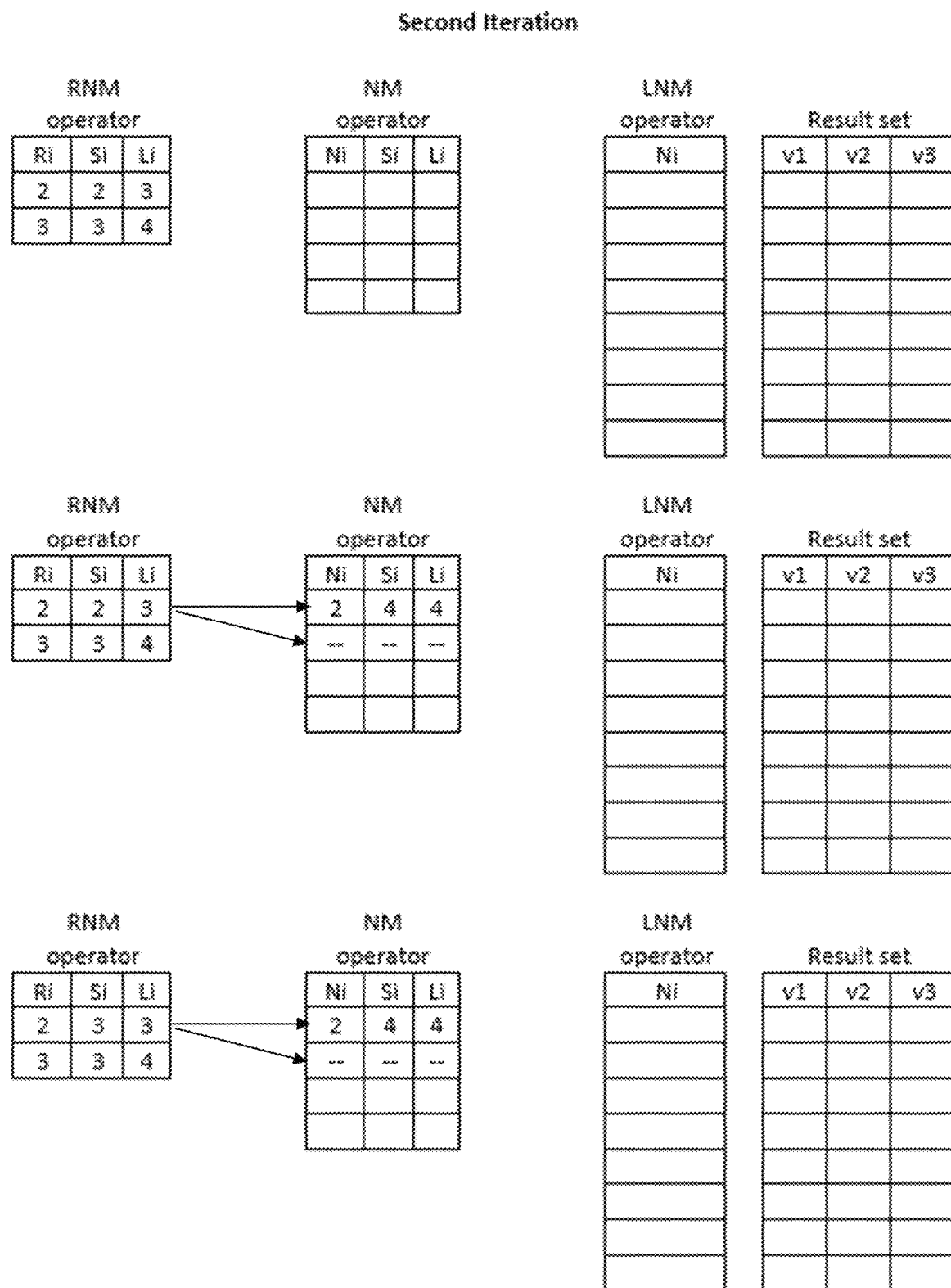
Figure 8F:
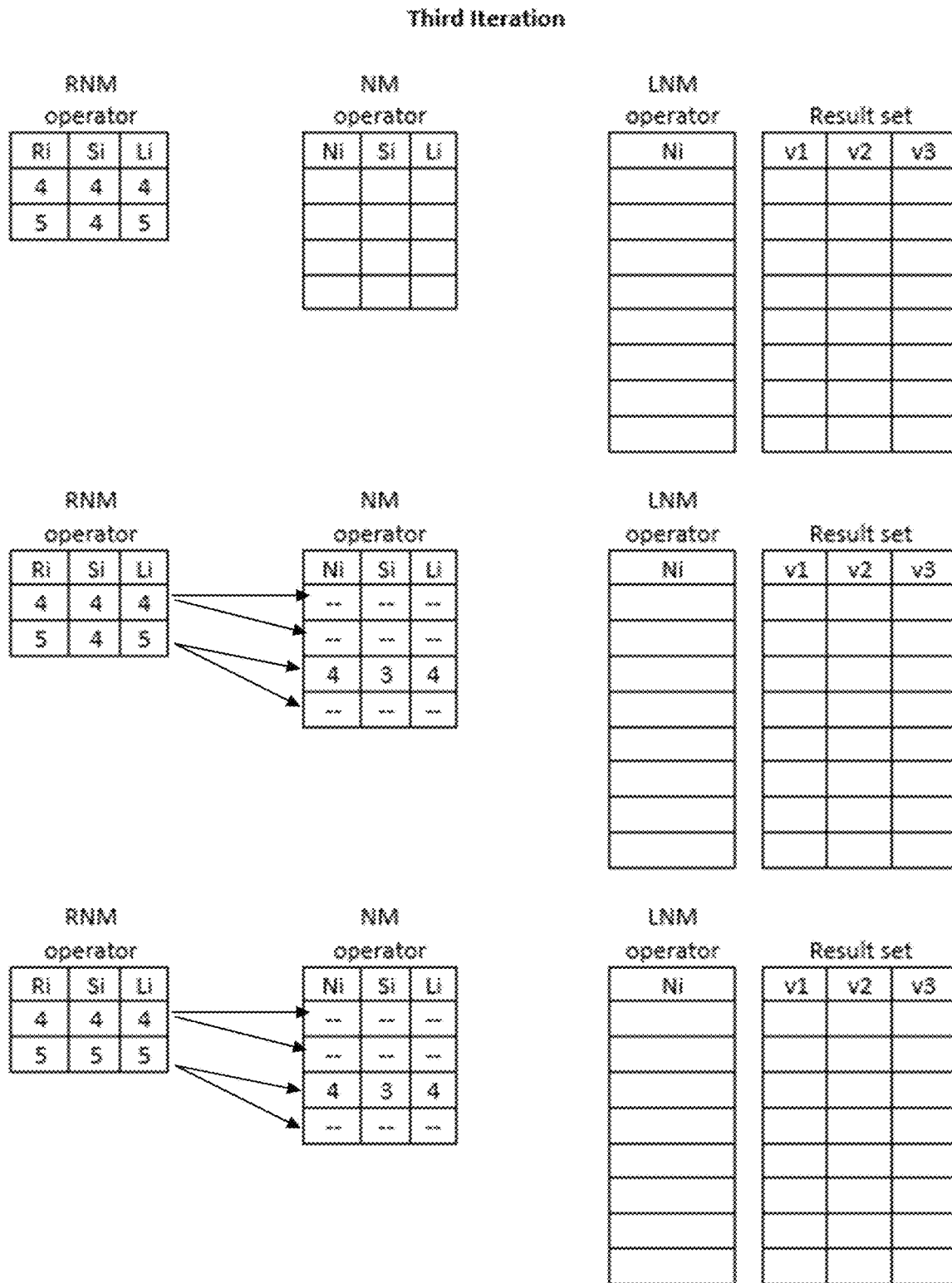

FIGS. 8B-8G illustrate the state of match operators during each iteration. In particular, FIGS. 8B-8C illustrate the state of match operators in the first iteration. FIGS. 8D-8E illustrate the state of match operators in the second iteration. FIGS. 8F-8G illustrate the state of match operators in the third iteration. As illustrated, the result set includes a path comprising vertex 0, vertex 2, and vertex 4, and another path comprising vertex 5, vertex 3, and vertex 1, both of which correspond to the paths determined above.

Sizing the Data Structure

As discussed above, each data structure uses sizing variables to control its memory footprint and to implement batch DFS execution. The data_size variable specifies the number of elements stored in a data structure and is configurable for every level. The chunk_size variable specifies how many neighbors (e.g., vertices matched by (b)) are explored for every parent (e.g., vertices matched by (a)) at every pull operation.

Each data structure is designed in such a way that the number of rows in a match operator is equal to the number of chunks in its child match operator. For example, in FIG. 8A, the RNM operator has data_size=2, and chunk_size=2.

If the chunk size is greater than 1 for each hop, than the LNM operator stores a number of rows exponential in the number of hops of the path. This exponential growth can be stopped by setting chunk_size to 1 for various match operators.

For chunk_size=1, then the way of traversing the neighbors is similar to DFS algorithm, and for chunk_size=∞, then the traversal algorithm is similar to BFS. Varying chunk_size allows for the tradeoff between achieving a high-degree of parallelism and being pipeline-friendly.

Indexing

Every row, at a given level, has a corresponding chunk at the next level, where its neighbors will be stored. In order to find the parent of index i, (i/chunk_size) is computed to determine the index of the parent in the parent data structure. In order to find the jth child of index i, (i*child→chunk_size+j) is computed to determine the index of the child in the child chunk.

Runtime Control Flow

In an embodiment, match operators are the main computing blocks of a graph table operator. They are responsible for producing vertices corresponding to every level of a target pattern. Given a target pattern, a sequence of match operators is generated at compile time. Match operators are chained according to a pull-based control flow. When requested rows from its parent operator in a query plan, the graph table operator pulls results from its chain of match operators and construct its output row-set from these results. When rows are accumulated to the capacity of the row-set, control is returned to the graph table operator's parent.

Every match operator has access to a CSR defining the graph. The result of the LNM operator is written to the graph table operator row source that can then be pipelined with other database relational operators.

Figure 9:
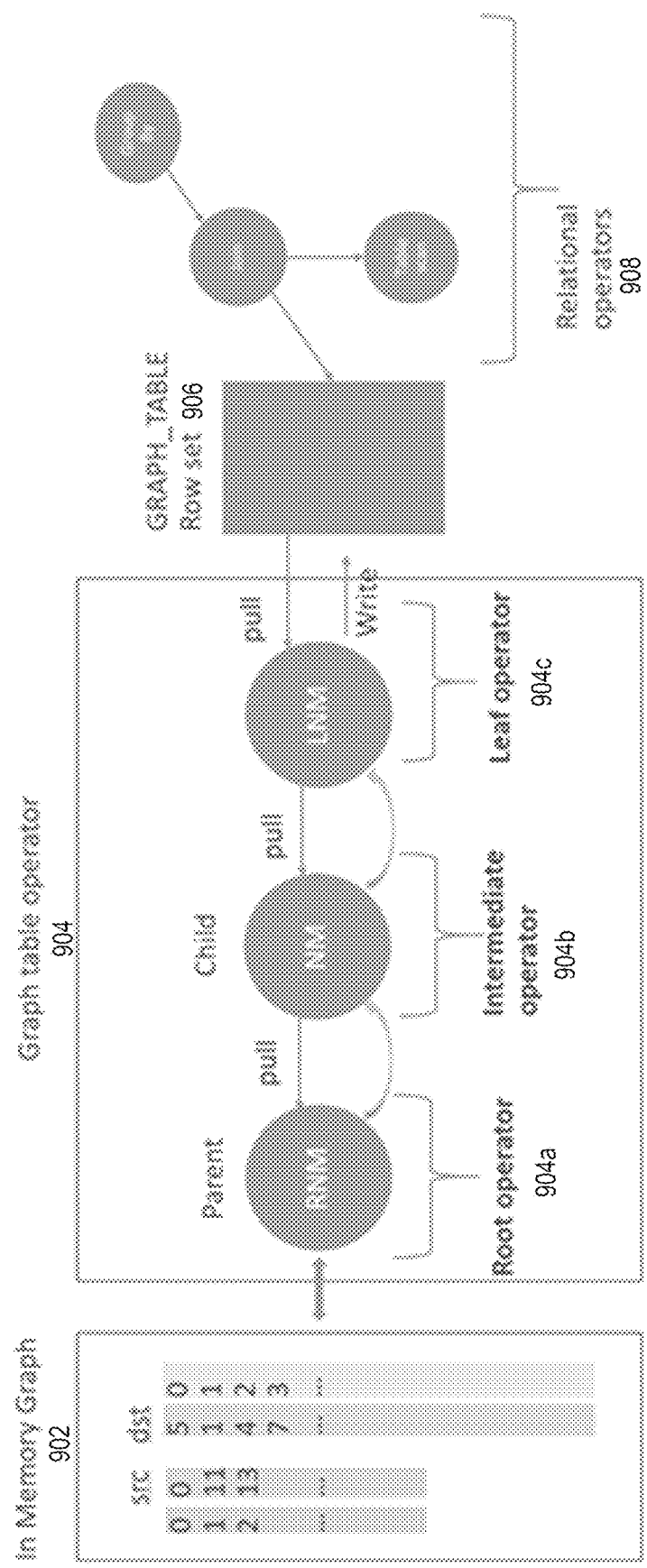
FIG. 9 is an example for a pull-based control flow.

FIG. 9 is an example for a pull-based control flow for a target pattern of form (a)→(b)→(c). A graph table operator 904 is pipelined with existing database relational operators 908 and references an in-memory graph 902. Note that the control flow and the data flow are in opposite directions. The control flow is from relational operators 908 to CSR 902, while the data flow is from CSR 902 to relational operators 908.

When the parent of the graph table operator 904 requests rows to process, the newly created operator will call a pull function on the LNM operator 904c to request rows from the graph table operator 904. If the LNM operator 904c still has valid rows in its data structure, then it writes them to the graph table operator's result table 906. If the LNM operator 904c does not have valid rows in its data structure, then the LNM operator 904c invokes the previous match operator 904b to fetch more neighbors from the previous operator 904b. This is done by calling a pull function on the previous match operator 904b and, then, processing the neighbors of the new vertices and storing results in its data structure. This process happens for each match operator in the path until reaching the RNM operator 904a, for which a pull function is simply loading the next chunk of vertices existing in a graph, by referencing the CSR 902 which represents the graph. Accordingly, each match operator in the chain will either consume more neighbors from its predecessor in the chain or call its predecessor's pull function to fetch the next batch of neighbors.

In an embodiment, a data structure at a level may not be filled with neighbors from a parent. The control flow can be modified to return only when the data structure at the level is full. For example, the match operator at the level may pull from the parent until either the level data structure is full or the parent runs out of data.

In an embodiment, iteration over valid entries in a parent data structure can be improved. For example, rather than iterating over all entries in the parent structure and jumping over invalid ones, an index of valid entries in a list is kept and referenced to iterate only over the indices present in the list. When an index becomes invalid (e.g., all neighbors for that entry were consumed), it is removed from the list.

Example Homogeneous Graph Search Process

Figure 10:
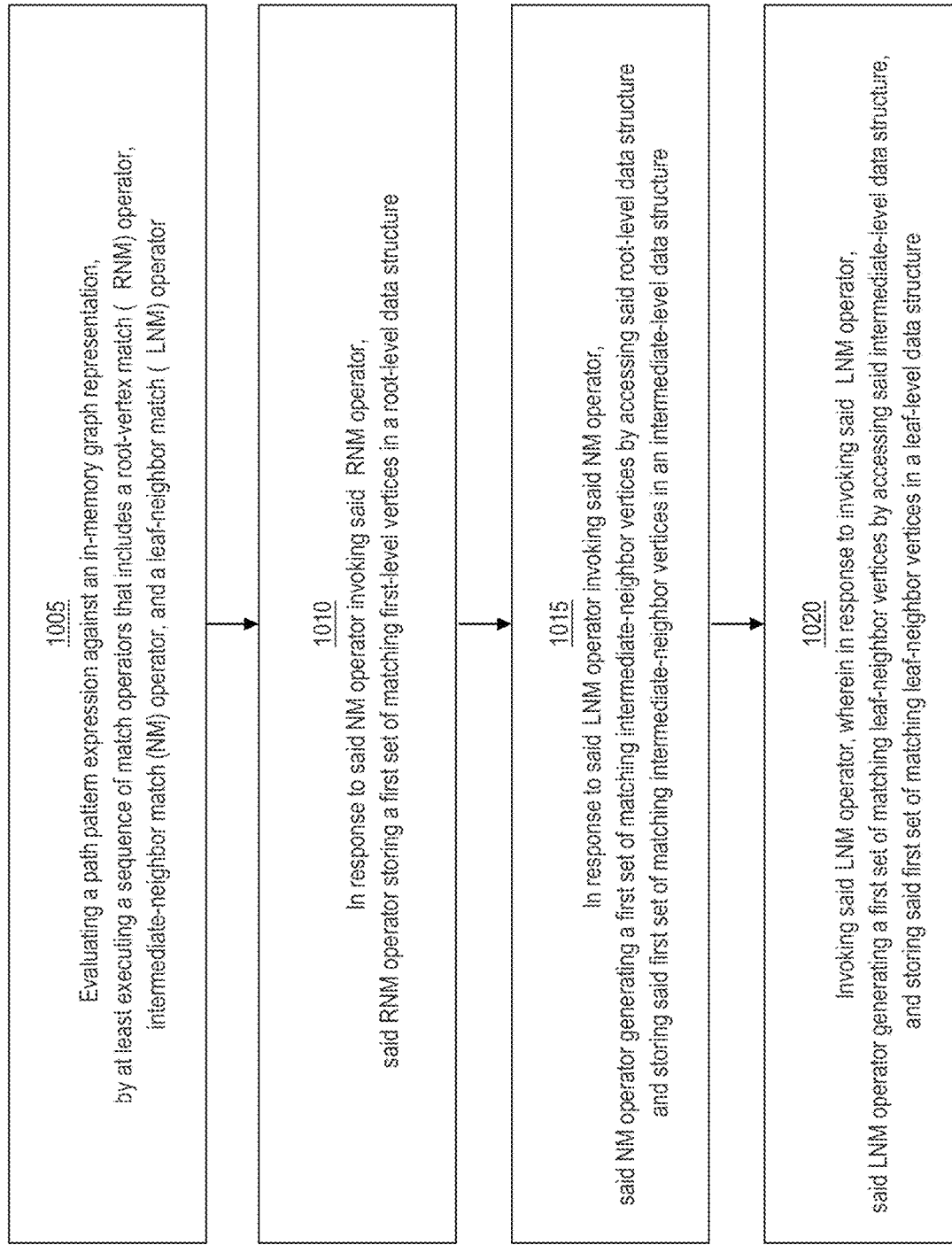
FIG. 10 illustrates another example flow diagram that depicts a process 1000 for supporting graph pattern matching queries inside a relational database system.

FIG. 10 illustrates an example flow diagram that depicts a process 1000 for supporting graph pattern matching queries inside a relational database system. The process 1000 assumes that a homogeneous property graph is defined from relational tables, and an in-memory representation of the homogeneous graph uses a CSR format.

At step 1005, a path pattern expression is evaluated against an in-memory graph representation by at least executing a sequence of match operators. The sequence of match operators includes a root vertex match (RNM) operator, an intermediate neighbor match (NM) operator, and a leaf neighbor match (LNM) operator.

The match operators perform their logic over multiple vertex/edges in a pipelined manner and produce a number of matches that are stored as result sets in respective data structures. Results to a query are pulled from the sequence of match operators, and an output table is constructed from these results. When the parent of a graph table operator that is associated with the path pattern expression, requests rows to process, the graph table operator invokes the LNM operator, which in turn invokes the NM operator, which in turn invokes the RNM operator.

At step 1010, in response to the NM operator invoking the RNM operator, the RNM operator stores a first set of matching first level vertices in a root level data structure.

At step 1015, in response to the LNM operator invoking the NM operator, the NM operator generates a first set of matching intermediate neighbor vertices by accessing the root level data structure and stores the first set of matching intermediate neighbor vertices in an intermediate level data structure.

In an embodiment, the NM operator explores a particular chunk size of a particular first level vertex in the first set of matching first level vertices in said root level data structure, wherein this particular chunk size specifies a number of neighbors of the particular first-level vertex to explore.

In an embodiment, in response to the NM operator generating the first set of matching intermediate neighbor vertices by accessing the root level data structure, the RNM updates data stored in the root level data structure to indicate the next unprocessed neighbor.

At step 1020, the LNM operator is invoked and, in response to invoking the LNM operator, the LNM operator generates a first set of matching leaf neighbor vertices by accessing the intermediate level data structure and stores the first set of matching leaf neighbor vertices in a leaf level data structure.

In an embodiment, the LNM operator explores a particular chunk size of a particular intermediate neighbor vertex in the first set of matching intermediate neighbor vertices in the intermediate level data structure, wherein this particular chunk size specifies a number of neighbors of the particular intermediate neighbor vertex to explore.

In an embodiment, in response to the LNM operator generating the first set of matching leaf neighbor vertices by accessing the intermediate level data structure, the NM updates data stored in the intermediate level intermediate level data structure.

When the leaf level data structure is filled with data, at least part of a result for the path pattern expression is generated. In an embodiment, the at least part of a result for the path pattern expression is generated based on the leaf level data structure, the intermediate level data structure, and the root level data structure. In an embodiment, the result for the path pattern expression may be pipelined with one or more database relational operators.

As shown, when an operator, in a sequence of match operators, is asked for tuples or rows by a child operator, if the operator has tuples, then the child operator will directly iterate over the neighbors of its parent operator. However, if the operator does not have tuples, then the operator will ask the same request from its parent operator.

Heterogenous Graphs

Most existing graph processing systems only provide support for handling homogeneous graphs, which means that the graph is stored by using only one vertex table and one single edge table, as in the example of FIGS. 2A-2B. However, this model can be extended such that the vertices and edges are split across multiple tables with different semantics and properties. This model would be beneficial when trying to add a graph processing runtime over an existing relational database, which has an already-defined schema.

Figures 11A, 11B:
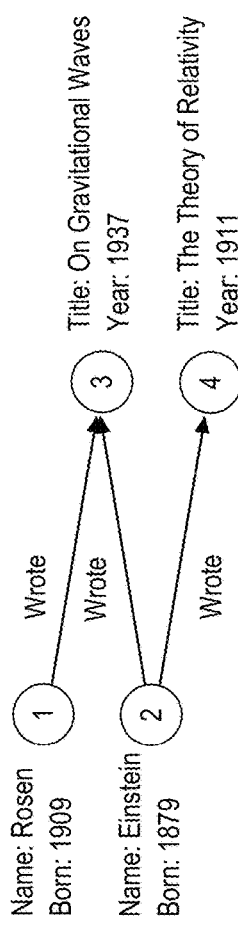
FIG. 11A illustrates another example property graph.
FIG. 11B illustrates example tables associated with the graph of FIG. 11A.

FIG. 11A shows an example graph structure of authors, papers and the author-paper relationships between them. In the homogeneous graph paradigm, all the authors and the papers vertices would be stored in the same table, following that the authors would have no values for the papers' properties and, similarly, that the papers would have no values for the authors' properties. The heterogeneous paradigm models better intuition, by having two vertices tables, one for authors and another for papers, each with their own specific properties, as shown in FIG. 11B.

Splitting the vertices and edges over multiple tables means also splitting the CSR, when using that graph representation. Therefore, if the edges are split over n tables, then n CSRs are constructed in order to define the graph, one for each edge table.

When running a pattern-matching query on a heterogeneous graph, a given pattern can correspond to multiple specializations. As an example, consider a graph that has two different vertex tables VT1 and VT2. When matching the pattern (a IS VT1)→(b IS VT2)→(c), two pattern specializations can be generated:

(a IS VT1)→(b IS VT2)→(c IS VT1)
(a IS VT1)→(b IS VT2)→(c IS VT2)

The specializations are generated at compile time, based on the metadata tracking the vertex and edge tables of the graph. Specializations are part of the same specialization tree if they have an overlapping common prefix (e.g., (a IS VT1)→(b IS VT2)). In an embodiment, a graph table operator computes the paths matching the pattern for each of these specializations.

Modified Runtime Design

Figure 12A:
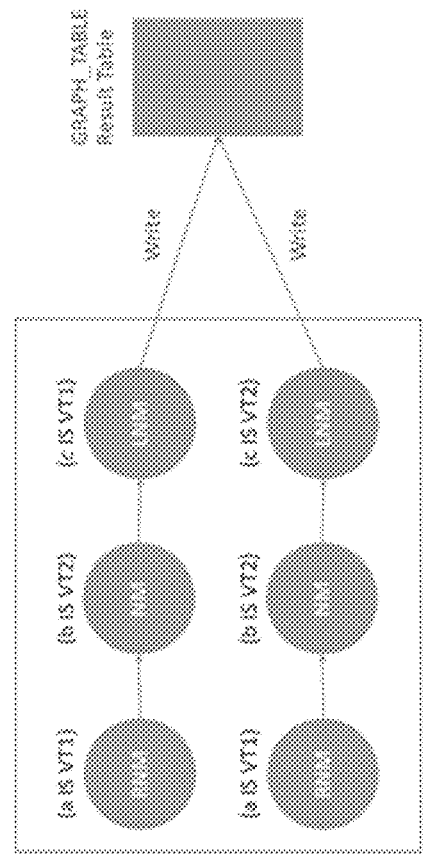
FIGS. 12A-12B illustrate different instantiations of a heterogeneous operator path.

There are different approaches to support multiple specializations. One approach to support multiple specializations is to create a different chain of match operators for every specialization. However, this may result in computing a sequence multiple times. For the example above, the common prefix (a IS VT1)→(b IS VT2) would be computed twice. FIG. 12A visually reflects this approach.

Another approach is to compute common prefixes in overlapping specializations, thereby decreasing pattern-matching queries run time for heterogeneous graphs. As further discussed below, this can be done by extending the match operators and control flow.

Extensions to the In-Memory Graph Representation

An in-memory representation of a heterogeneous graph includes as many CSRs as there are edge tables in a graph. A key difference to the homogeneous graph representation described above is that the indices stored in the destination array of a CSR are indices to a destination vertex table that is different from the source array of the CSR.

Figure 13:
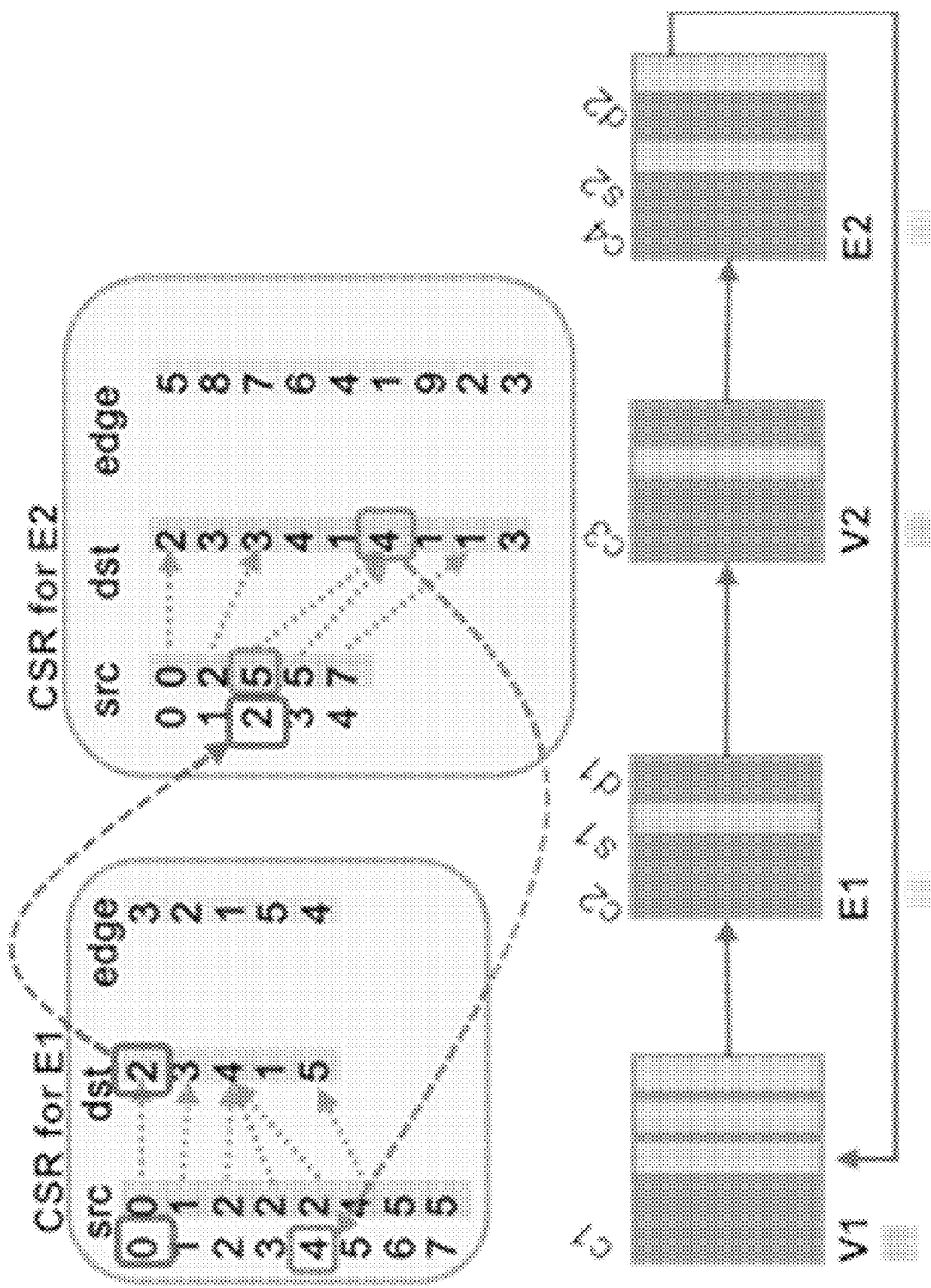
FIG. 13 illustrates an example of a heterogeneous graph in-memory representation.

An example of a heterogeneous graph in-memory representation is illustrated in FIG. 13. In the example of FIG. 13, The graph includes two vertex tables (e.g., V1, V2) and two edges table (e.g., E1, E2). The corresponding in-memory representation includes two CSRs: one for each edge tables. The src array for E1's CSR (respectively, E2's CSR) has as many entry as there are rows in V1 (respectively, rows in V2). Values stored in the dst array of E1's CSR (respectively, E2's CSR) are indices to src array used for V2 (respectively, V1). In this example, there is only one such src array for V1, which is the one used in the CSR for E2.

It may be possible for a vertex table to be a source in multiple edge tables and, therefore, to have a src array in multiple CSRs; that array would have the same dimension and the same entry would be assigned to the same row (i.e., vertex) in all src arrays. They would, however, hold a neighbor index specific to the dst array of the specific CSR.

Operator Extensions

Figure 12B:
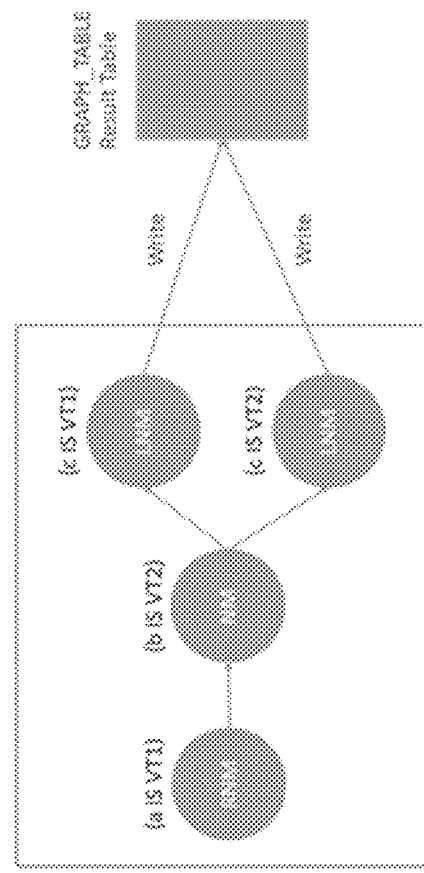

Compared to the homogeneous implementation, every match operator involving neighbor matching (e.g., RNM operator, NM operator) may use multiple CSRs, one for each specialization that branches from that match operator. From the previous example, the match operator matching (c IS VT1) will use a CSR corresponding to the edge table associating VT2 with VT1, and the match operator matching (c IS VT2) will use a CSR corresponding to the edge table associating VT2 with VT2. FIG. 12B illustrates an operators graph generated for the previous example matching the pattern (a IS VT1)→(b IS VT2)→(c).

An important aspect to observe is that the simple path pattern is now transformed into a specialization tree of operators, which might have multiple leaf nodes. Each path from a tree root to a tree leaf corresponds to a path specialization, which generates different paths. Also, every specialization has the same length. In other words, all the paths from a root operator to a leaf operator have the same length, which is equal to the length of the initial path pattern. Furthermore, each leaf node should produce results into the graph table result table.

Match Operators Data Structure Extensions

In heterogeneous graphs processing, match operators may have multiple children match operators. For a matching operator where a common prefix ends, referred to as a branching operator (e.g., the node matching (b) in the previous example), this branching match operator stores neighbor information for each of its children match operators. The branching match operator state stores an Si array, Li array and Next Valid array for every child match operator. However, since the Ni array only depends on the previous neighbor index in the CSR, it can be shared among all the specializations stored in that operator.

Figure 14:
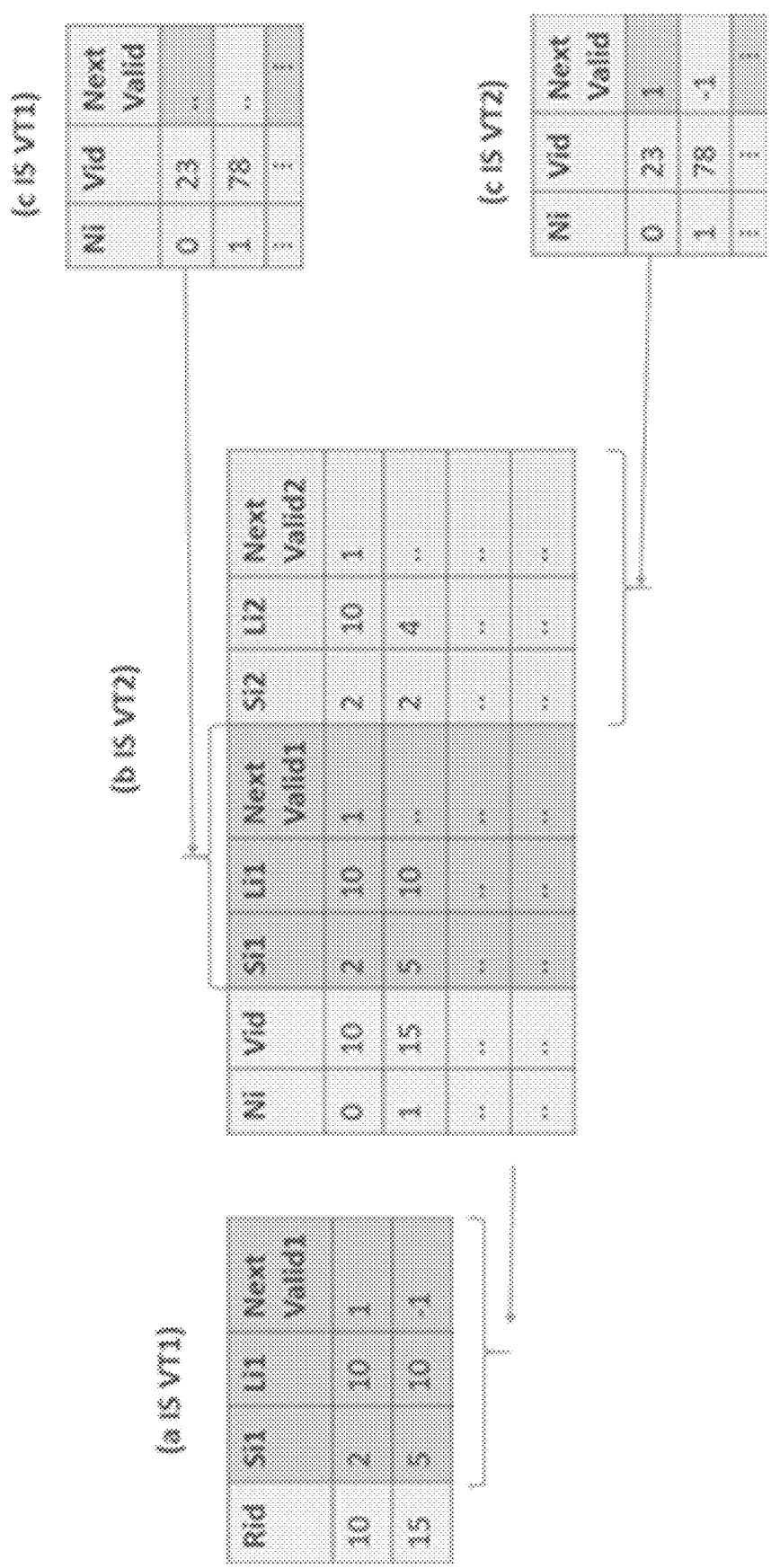
FIG. 14 illustrates an example of a possible state of the graph table operators.

FIG. 14 illustrates an example of a possible state of the graph table operators when matching the above-defined pattern of (a IS VT1)→(b IS VT2)→(c). The branching operator (b) stores neighbor information for each of its children match operators, (c IS VT1) and (c IS VT2).

In an embodiment, the additional number of columns in the data structure corresponding to the branching match operator for the children match operators are generated at compile time.

In an embodiment, the vertex id for each row can be stored in an Vid array, for optimization, so as the CSR need not be accessed for same information multiple times. The pull function of every children acts on a corresponding pair of Si, Li and Next Valid arrays.

Control Flow Extension

In heterogeneous graphs processing, a path pattern is compiled into a set of independent specialization trees. A graph table operator executes each of those specialization trees to produce its output row set. The different specialization trees can be computed sequentially or in parallel, in which case, different threads are synchronized when writing results to the output row set.

As discussed above, a specialization tree contains multiple leaf operators. In order to return paths from all possible specializations, the graph table operator sequentially calls the pull function on the leaf match operators and writes the matches to the graph table result table. The change at the row set level is one change to the control flow execution when there are multiple leaf operators in a specialization tree.

Sharing the computation of prefix of a path pattern in the specialization tree requires the graph table operator to implement additional control flow to synchronize all leaf operators feeding on the same branching operators in the specialization tree. In an embodiment, the graph table operator may maintain a map <NODE, STATE> that keeps track of the state of every node in the specialization tree, wherein STATE can be ACTIVE or WAITING. The initial state for all nodes in the specialization tree may be ACTIVE.

Another change to the control flow execution is at a branch node level. Since the Ni array is shared for all the specializations starting from a branching operator, the branching operator must first process all the neighbors for every specialization before calling the pull function of its parent match operator to fetch more data. In an embodiment, branching operators have an additional pull method that their children will call instead of the original pull method. In addition, the original pull methods of NM and LNM operators need extensions.

Example Heterogeneous Graph Search Process

Figure 15:
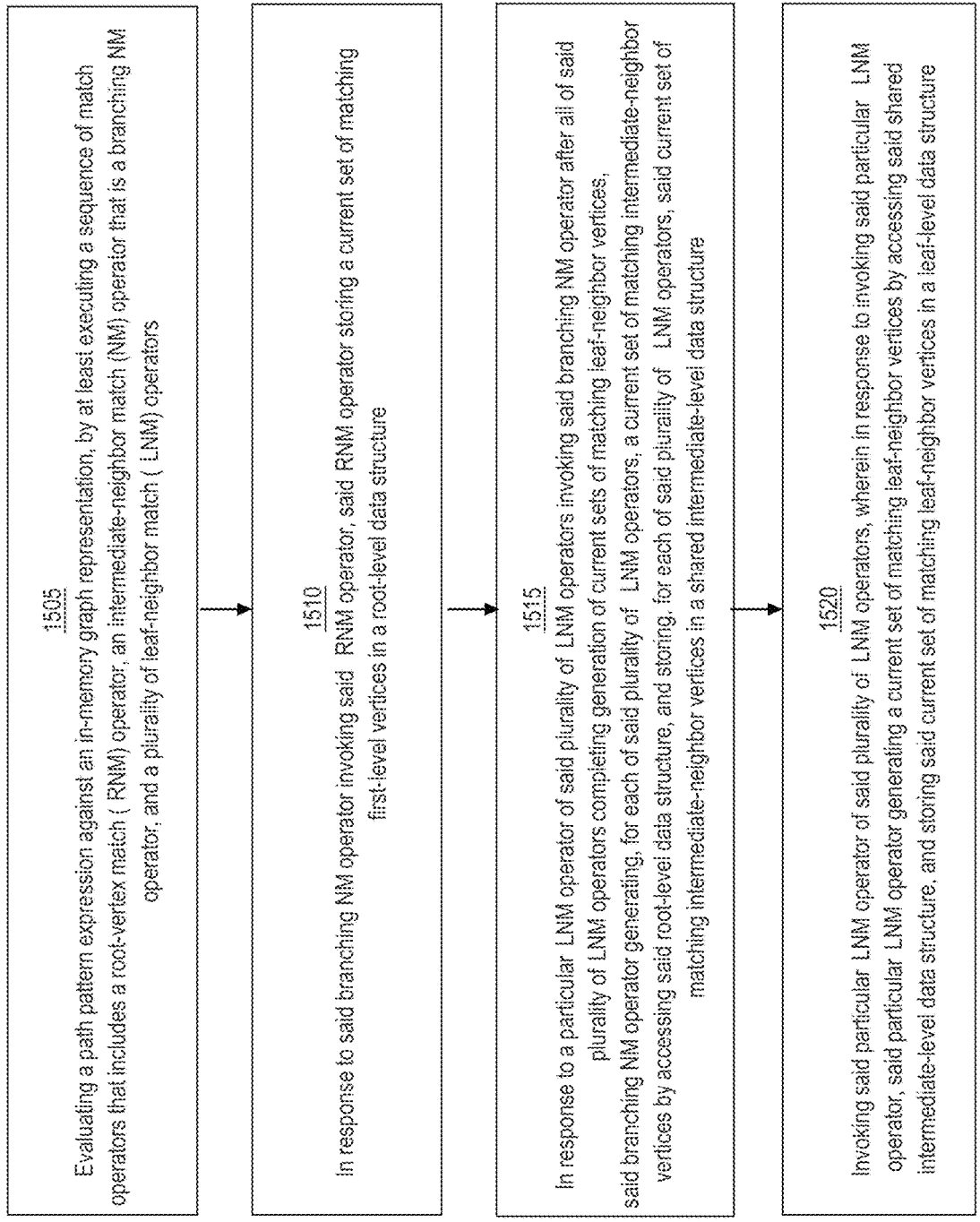
FIG. 15 illustrates another example flow diagram that depicts a process for supporting graph pattern matching queries inside a relational database system.

FIG. 15 illustrates another example flow diagram that depicts a process 1500 for supporting graph pattern matching queries inside a relational database system. The process 1500 assumes that a heterogeneous property graph is defined from relational tables, and an in-memory representation of the heterogeneous graph uses a CSR format. A path pattern expression is compiled into multiple specializations, with each specialization rooted by a starting vertex table in the graph.

At step 1505, a path pattern expression is evaluated against an in-memory graph representation by at least executing a sequence of match operators. The sequence of match operators includes a root vertex match (RNM) operator, an intermediate neighbor match (NM) operator that is a branching NM operator, and a plurality of leaf neighbor match (LNM) operators. The plurality of LNM operators includes at least two LNM operators of the plurality that are children match operators of the branching NM operator. The branching NM operator is the only operator with more than one child match operators.

Each path from the RNM operator to a LNM operator corresponds to a specialization, which generates different paths. Every specialization is the same length.

At step 1510, in response to the branching NM operator invoking the RNM operator, the RNM operator stores a current set of matching first level vertices in a root level data structure.

At step 1515, in response to the particular LNM operator of the plurality of LNM operators invoking the branching NM operator after all of the plurality of LNM operators have completed generation of current sets of matching leaf neighbor vertices, the branching NM operator generates, for each of the plurality of LNM operators, a current set of matching intermediate neighbor vertices by accessing the root level data structure, and stores, for each of the plurality of LNM operators, the current set of matching intermediate neighbor vertices in a shared intermediate level data structure.

In an embodiment, the in-memory graph representation for the heterogeneous graph comprises multiple CSRs, one per edge table in the graph. The CSRs are referenced by the branching NM operator when generating the sets of matching intermediate-neighbor vertices.

The shared intermediate level data structure stores once a common path pattern prefix of the path pattern expression.

At step 1520, the particular LNM operator of the plurality of LNM operators is invoked and, in response to invoking the particular LNM operator, the particular LNM operator generates a current set of matching leaf neighbor vertices by accessing the shared intermediate level data structure and stores the current set of matching leaf neighbor vertices in a leaf level data structure.

In an embodiment, the branching NM operator controls the state of its children match operators (e.g., ACTIVE/WAITING) to synchronize consumption of matches from the common path pattern prefix. A pull request from all but the last active child match operator results in the children match operators to wait. A pull request from the last active child match operator triggers pulling more matches from the parent match operator (e.g., RNM operator) of the branching NM operator and reactivating all of the children match operators of the branching NM operator if additional matches are available.

Each of the LNM operators is sequentially invoked and produces results into a graph table result table. Result for the path pattern expression may be pipelined with one or more database relational operators.

In an embodiment, sharing the processing of the common path pattern prefix reduces processing and memory usage and turns the specializations into a specialization tree of match operators including the branching NM operator.

As shown, when an operator, in a sequence of match operators, is asked for tuples or rows by a child operator, if the operator has tuples, then the child operator will directly iterate over the neighbors of its parent operator. However, if the operator does not have tuples, then the operator will ask the same request from its parent operator.

Extensions to Support Complex Path Patterns

The graph query runtime is extendible to support path patterns that are more complex than line-shaped path patterns discussed above.

Example complex path patterns include:
trees: An example of a query pattern including trees which are not line-shaped is (a)→(b)→(c), (a)→(d), where (c) is not a leaf node. After (c) is computed, (d) is then computed. This can be done by adding in the data structure holding (c) neighbor information for (a), such that the runtime knows it has to return to continue matching other paths.
cycles: An example of a query pattern including a cycle is (a)→(b)→(c)→(a). A naive initial version would be to convert the cycle in a cross-variable filter at query compilation time. The resulting query pattern would be: (a)→(b)→(c)→(d), where (a)=(d).

Complex Path Patterns Involving Trees

Figure 16A:
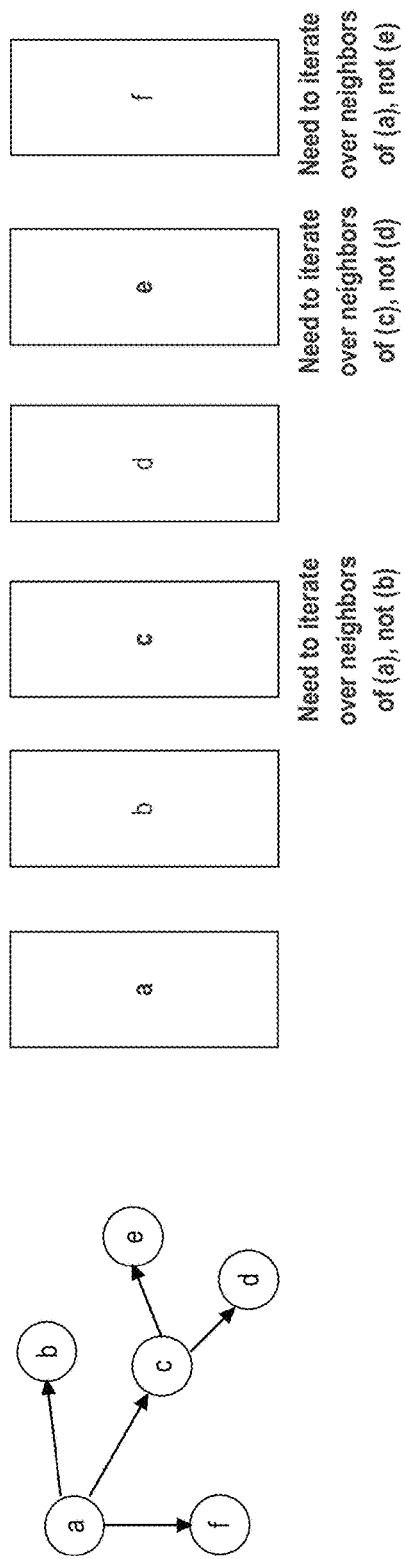
FIG. 16A illustrates an example tree pattern to compute and a set of data structures corresponding to vertices in the tree pattern.

For complex path patterns involving trees, a data structure must store results matched by every pattern variable. FIG. 16A illustrates an example tree pattern to compute and a set of data structures corresponding to vertices in the tree pattern. The tree pattern can be decomposed as line-shaped path patterns including:
(a)→(b),
(a)→(c)→(d),
(c)→(e), and
(a)→(f).

From the tree pattern in FIG. 16A, for example, when matching (f), it is the neighbors of (a), not the neighbors of the preceding data structure of (e), that need to be iterated over because (e) is not (f)'s neighbor. Similarly, when matching (c), it is the neighbors of (a), not the neighbors of the preceding data structure of (b), that need to be iterated over because (b) is not (c)'s neighbor. Unlike (c) and (f), the neighbors of the preceding data structure of (b) are iterated over since (a) is indeed (b)'s neighbor, in the example of FIG. 16A.

Figure 16B:
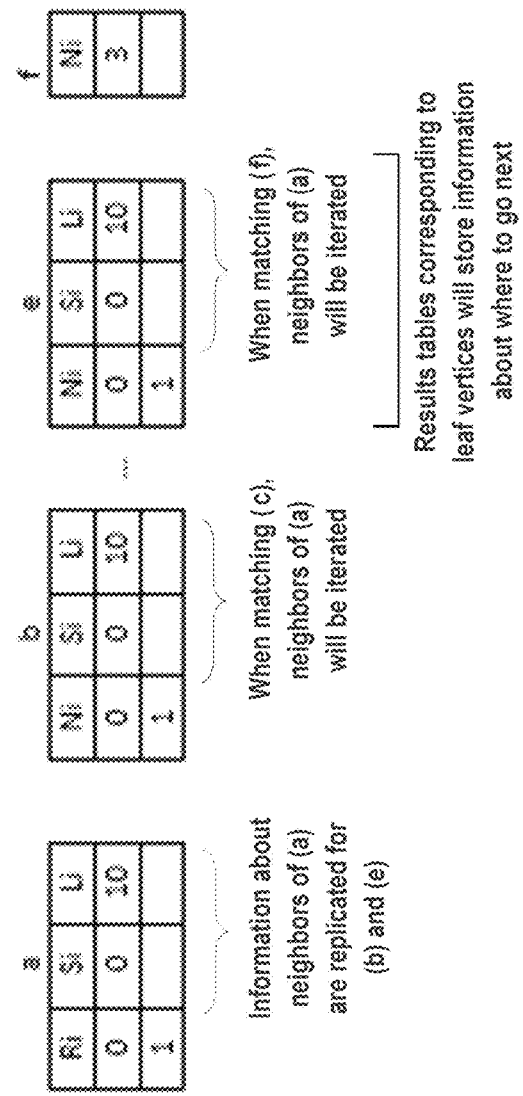
FIG. 16B illustrates example data structures for storing match results for the tree pattern of FIG. 16A.

FIG. 16B illustrates example data structures for storing match results for the tree pattern of FIG. 16A. As illustrated in FIG. 16B, the Si and Li arrays in the data structure corresponding to (b) store neighbor information of (a). Similarly, the Si and Li arrays in the data structure corresponding to (e) store neighbor information of (a). Unlike (c) and (f), (b) has direct access to neighbor information of (a) since the data structure of (b) is sequentially adjacent to the data structure of (a). Accordingly, the following observations are identified:

Each of (c) and (f) requiring preceding (b) and (e), respectively, to store neighbor information of (a), is a child of (a); and Data structures of (c) and (f) are not sequentially adjacent to the data structure of (a). (c) and (f) do not have direct access to (a).

In an embodiment, when computing next neighbor information of (a), the neighbor information is copied or replicated in the data structures corresponding to (b) and (e). Although Si and Li arrays give information about which neighbors to iterate next, they might not be neighbors of the current vertex.

Example Graph Search Process of a Complex Path Pattern Involving a Tree

Figure 17:
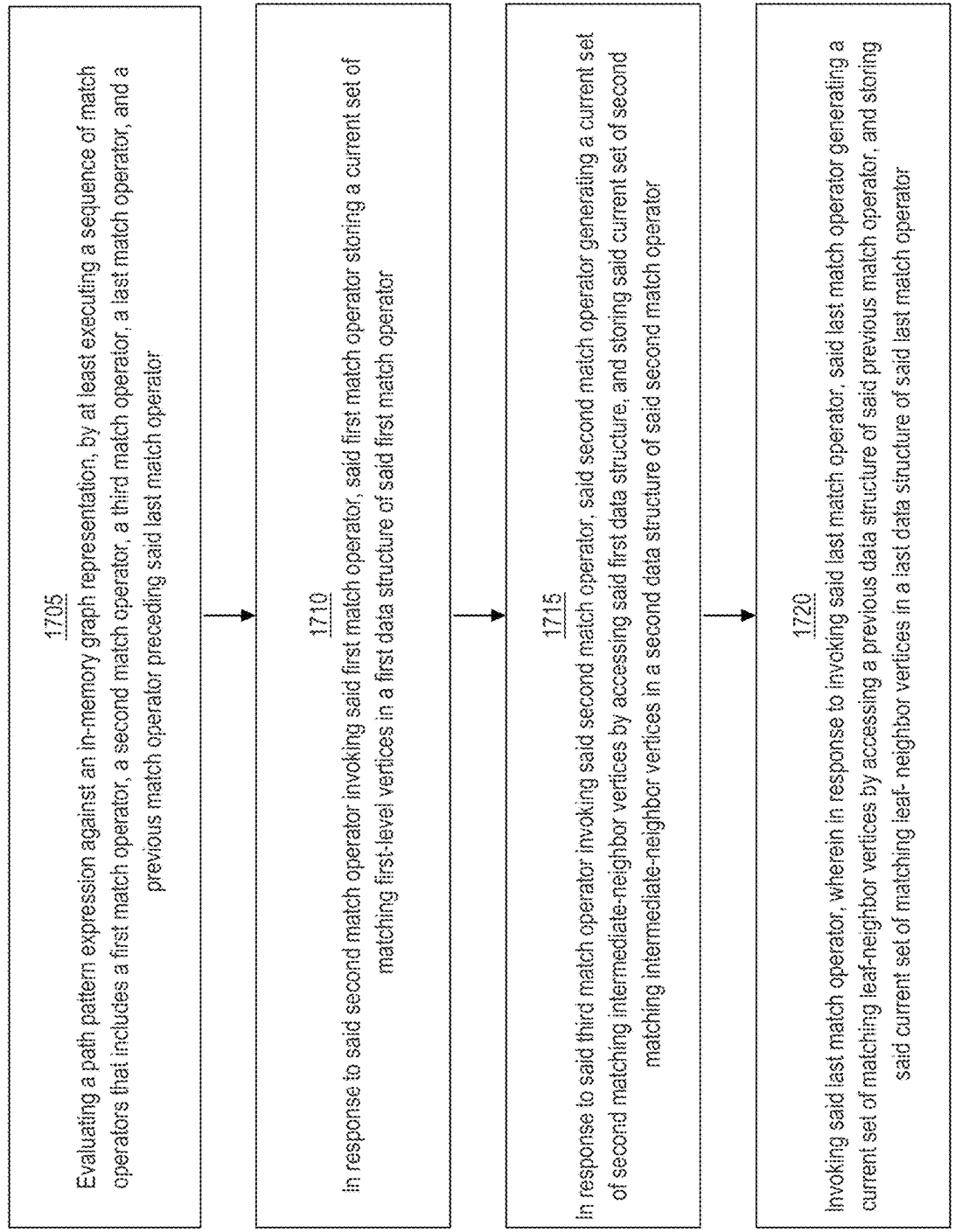
FIG. 17 illustrates another example flow diagram that depicts a process for supporting graph pattern matching queries inside a relational database system.

FIG. 17 illustrates another example flow diagram that depicts a process 1700 for supporting graph pattern matching queries inside a relational database system. The process 1700 assumes that a property graph is defined from relational tables, an in-memory representation of the graph uses a CSR format, and a path pattern expression involving a tree.

At step 1705, a path pattern expression is evaluated against an in-memory graph representation by at least executing a sequence of match operators. The sequence of match operators includes a first match operator, a second match operator, a third match operator, a last match operator, and a previous match operator preceding said last match operator.

In an embodiment, the path pattern expression comprises a plurality of nodes that includes a root node and a plurality of parent nodes. Each parent node of the plurality of parent nodes has at least one child node. Each child node is a child of one of the plurality of parent nodes. In an embodiment, each of the plurality of nodes is associated with a match operator of the sequence of match operators.

In an embodiment, neighbor information associated with a parent node of said plurality of parent nodes is stored in a data structure for a preceding match operator that is sequentially before a subsequent match operator that (1) corresponds to a node that is a child of said parent node and (2) is not sequentially adjacent to a match operator that corresponds to said parent node. As an illustration, in the example of FIGS. 16A and 16B, neighbor information of (a) is stored only in the data structures corresponding to (b) and (e), which are sequentially before (c) and (f). Although (b) is a child of (a), neighbor information of (a) is not stored in the preceding match operator that is sequentially before (b) because (b) has direct access to (a)'s neighbor information as it is sequentially adjacent to (a).

At step 1710, in response to the second match operator invoking the first match operator, the first match operator stores a current set of matching first-level vertices in a first data structure of the first match operator.

At step 1715, in response to the third match operator invoking the second match operator, the second match operator generates a current set of second matching intermediate-neighbor vertices by accessing the first data structure and stores the current set of second matching intermediate-neighbor vertices in a second data structure of the second match operator.

At step 1720, the last match operator is invoked and, in response to invoking the last match operator, the last match operator generates a current set of matching leaf-neighbor vertices by accessing a previous data structure of the previous match operator and stores the current set of matching leaf-neighbor vertices in a last data structure of the last match operator.

When the last data structure is filled with data, at least part of a result for the path pattern expression is generated. In an embodiment, the result for the path pattern expression may be pipelined with one or more database relational operators.

As shown, when an operator, in a sequence of match operators, is asked for tuples or rows by a child operator, if the operator has tuples, then the child operator will directly iterate over the neighbors of its parent operator. However, if the operator does not have tuples, then the operator will ask the same request from its parent operator.

Complex Path Patterns Involving Cycles

For complex path patterns involving cycles, there are different options. A naive option, as described above, is to transform (a)→(b)→(c)→(a) to (a)→(b)→(c)→(d), where a=d, and execute the pattern via the current runtime.

Alternatively, a specialized operator, which is referred to as a common neighbor match operator, may be used to iterate over common neighbors when there are two matched nodes (for example, (a) and (c)). In this regard, (a) and (c) are first matched and (b) is then matched.

Example Graph Search Process of a Complex Path Pattern Involving a Cycle

Figure 18:
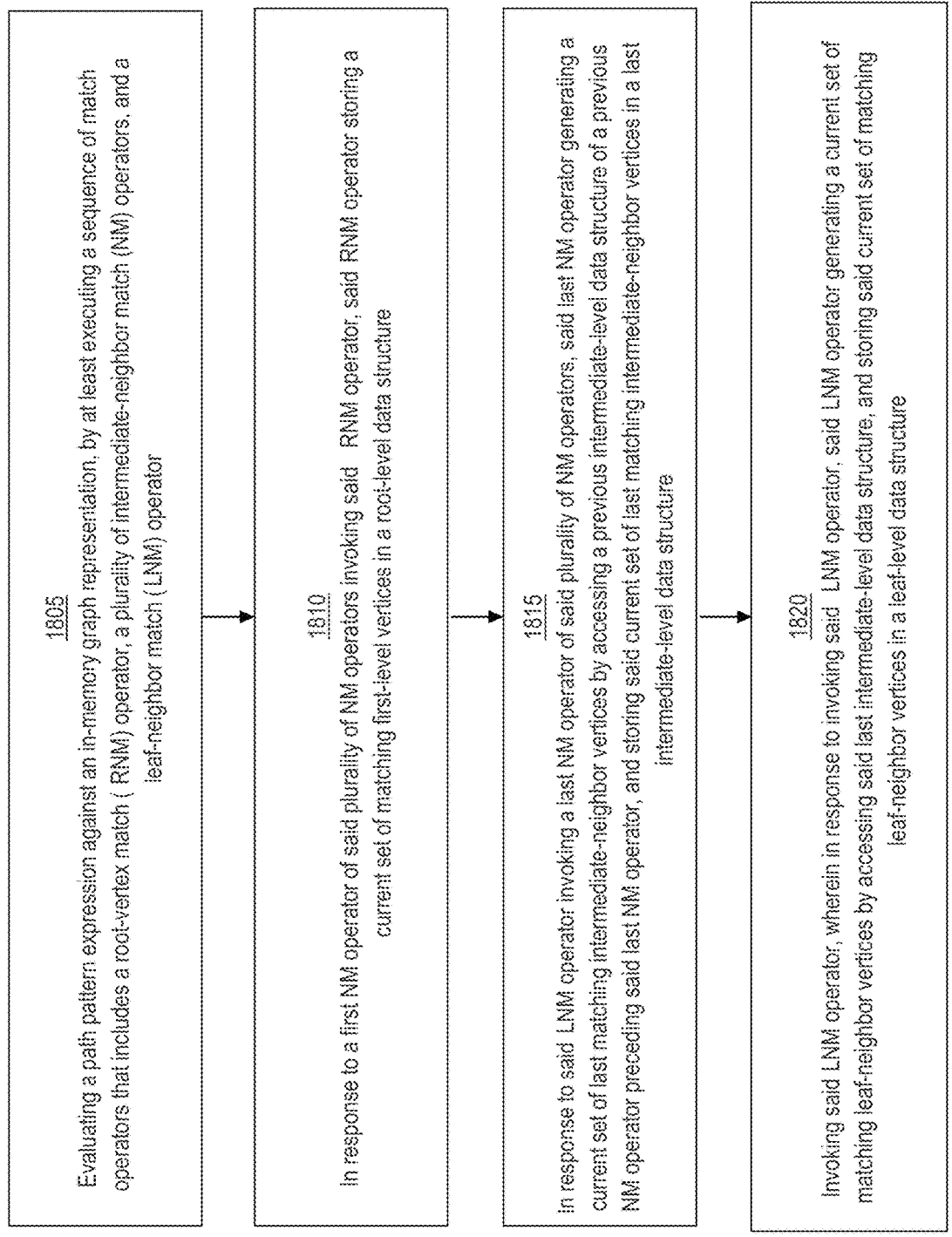
FIG. 18 illustrates yet another example flow diagram that depicts a process for supporting graph pattern matching queries inside a relational database system.

FIG. 18 illustrates yet another example flow diagram that depicts a process 1800 for supporting graph pattern matching queries inside a relational database system. The process 1800 assumes that a property graph is defined from relational tables, an in-memory representation of the graph uses a CSR format, and a path pattern expression involving a cycle.

At step 1805, a path pattern expression is evaluated against an in-memory graph representation by at least executing a sequence of match operators. The sequence of match operators includes a root-vertex match (RNM) operator, a plurality of intermediate-neighbor match (NM) operators, and a leaf-neighbor match (LNM) operator.

In an embodiment, the path pattern expression comprises a plurality of nodes that includes a particular node and a plurality of parent nodes. Each parent node of the plurality of parent nodes has one child node. Each child node is a child of one of the plurality of parent nodes.

In an embodiment, a number of match operators in said sequence of match operators is one more than a number of nodes in said plurality of nodes. In an embodiment, each of the plurality of nodes other than the particular node is associated with a match operator of a NM operator of the plurality NM operators. The particular node is associated with both of the RNM operator and the LNM operator.

At step 1810, in response to a first NM operator of the plurality of NM operators invoking the RNM operator, the RNM operator stores a current set of matching first-level vertices in a root-level data structure.

At step 1815, in response to the LNM operator invoking a last NM operator of the plurality of NM operators, the last NM operator generates a current set of last matching intermediate-neighbor vertices by accessing a previous intermediate-level data structure of a previous NM operator preceding the last NM operator, and stores the current set of last matching intermediate-neighbor vertices in a last intermediate-level data structure.

At step 1820, the LNM operator is invoked and, in response to invoking the LNM operator, the LNM operator generates a current set of matching leaf-neighbor vertices by accessing the last intermediate-level data structure and stores the current set of matching leaf-neighbor vertices in a leaf-level data structure.

When the leaf-level data structure is filled with data, at least part of a result for the path pattern expression is generated. In an embodiment, the result for the path pattern expression may be pipelined with one or more database relational operators.

As shown, when an operator, in a sequence of match operators, is asked for tuples or rows by a child operator, if the operator has tuples, then the child operator will directly iterate over the neighbors of its parent operator. However, if the operator does not have tuples, then the operator will ask the same request from its parent operator.

Parallel Execution

In an embodiment, the query engine may exploit parallelism to efficiently process a path pattern. One consideration is to split work across execution threads. The main unit of work to parallelize is the neighbor iteration. Level sync parallelism entails parallelizing neighbor iteration for every operator. Every thread will pick a number of rows from an operator (e.g., at level i) such that the total number of neighbors to iterate on is equal to a predefined job_size constant, and it will write its results at the corresponding chunk of its child operator (e.g., at level i+1).

Another consideration is to achieve work balance (fair distribution of work) when high-degree nodes are present in the data set. In order to achieve work balance, vertices whose number of neighbors is greater than the job_size parameter is split. A high degree vertex in an operator is split it by writing its Ni multiple times in the corresponding chunk in the child operator, such that for every row it holds $Li-Si<job\_size$. For vertices whose number of neighbors is greater than chunk_size*job_size, its remaining neighbor information is written in a chunk state, from which the operator can consume on backtrack. This ensures that every thread iterates over a similar number of neighbors, achieving thus work balance.

FIG. 19 illustrates a parallel execution example. By exploiting parallelism, work balance is achieved since each thread iterates over the same number of neighbors. No synchronization is needed because different threads write to different result chunks. In an embodiment, the job_size constant is configurable such that the compute time limit per job inside the DB is DB runtime compliant.

Adaptive Operators

In an embodiment, operators (control flow and data structures) may be tuned in order to adapt them to different input data. The choice of a tuned operator can be done at compile time based on various data statistics, such as average degree of neighbors, diameter, connectivity metrics, etc., on the input graph.

When RNM and NM operators consume neighbors, it is checked, for every newly generated neighbor, if it has next neighbors or not. In the case that it has neighbors, then the vertex and its neighbor information are written to the underlying data structure; otherwise, the next neighbor is checked. This control flow is very effective when the path pattern has a very high degree of selectivity as it avoids materializing useless data (neighbors that do not have further neighbors). For example, if (a)(b)(c) is matched, then writing to the data structure storing vertices matching (b) all the vertices that do not have neighbors (so they cannot have a (c)) can be avoided.

On the other hand, this control flow can be suboptimal, as every time a value from CSR dst array (the neighbor id) is read, CSR src array must be accessed to read neighbor information. This can break locality and reduce the potential of using SIMD instructions. In this regard, the control flow can be modified to first store the neighbor id (regardless if it has more neighbors or not) and only then access neighbor information. In the case of non-selective path patterns, this modification can bring big benefits.

The same modification can be applied in the case of heterogeneous graphs. In addition to that, in the case of branching nodes (that store neighbor information for multiple children), Ni array may be replicated for every <Si, Li> pair, allowing for independent iteration over neighbors in different child specializations. This can be very useful when the two specializations have different degrees of selectivity.

Difference and Advantages

Compared to traditional database systems, the runtime leverages a main-memory graph representation in a relational execution engine to achieve graph pattern matching performance, which is significantly better than using state of the art join operators. In the case of heterogeneous graphs, the runtime allows sharing computation of common prefixes across multiple instantiations of a path pattern. This approach brings savings both in terms of compute time and memory footprint as the overlapping prefixes need to be computed and stored only once.

Compared to traditional graph processing systems, the runtime efficiently combines BFS and DFS exploration in order to efficiently address challenges found inside a single machine relational database system when processing graph queries (e.g., pipeline friendly, small memory footprint and locality on neighbor iteration). The result is a batch-DFS exploration where, at every level, only a batch of neighbors is explored. The batch size is configurable at every level.

The batch-DFS exploration addresses the above-mentioned graph processing challenges. For example, the batch-DFS exploration is pipeline friendly. It is suitable for usage in relational DBMSs. The batch allows for exploration of only a small number of neighbors at a time, thus allowing to stream tuples to the next match/relational operator much faster than a classical BFS approach. The size of a batch can be adapted just-in-time to available resource (number of available core/available memory).

For another example, the batch-DFS exploration has a small memory footprint. The total memory footprint of the runtime can be controlled by configuring the batch size at every level. This does not limit the size of queries that can be processed. Generated paths can be stored in a prefix encoded way by using smart data structures.

For yet another example, the batch-DFS exploration performs locality on neighbor iteration. It can achieve the performance of the more classic BFS exploration by iterating over a batch of neighbors at a time, increasing thus probability for cache hits.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimization and Execution Plans

Query optimization generates one or more different candidate execution plans for a query, which are evaluated by the query optimizer to determine which execution plan should be used to compute the query.

Execution plans may be represented by a graph of interlinked nodes, each representing an plan operator or row sources. The hierarchy of the graphs (i.e., directed tree)

represents the order in which the execution plan operators are performed and how data flows between each of the execution plan operators.

An operator, as the term is used herein, comprises one or more routines or functions that are configured for performing operations on input rows or tuples to generate an output set of rows or tuples. The operations may use interim data structures. Output set of rows or tuples may be used as input rows or tuples for a parent operator.

An operator may be executed by one or more computer processes or threads. Referring to an operator as performing an operation means that a process or thread executing functions or routines of an operator are performing the operation.

A row source performs operations on input rows and generates output rows, which may serve as input to another row source. The output rows may be new rows, and or a version of the input rows that have been transformed by the row source.

A match operator of a path pattern expression performs operations on a set of input matching vertices and generates a set of output matching vertices, which may serve as input to another match operator in the path pattern expression. The match operator performs logic over multiple vertex/edges to generate the set of output matching vertices for a specific hop of a target pattern corresponding to the path pattern expression.

An execution plan operator generates a set of rows (which may be referred to as a table) as output and execution plan operations include, for example, a table scan, an index scan, sort-merge join, nested-loop join, filter, and importantly, a full outer join.

A query optimizer may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 20:
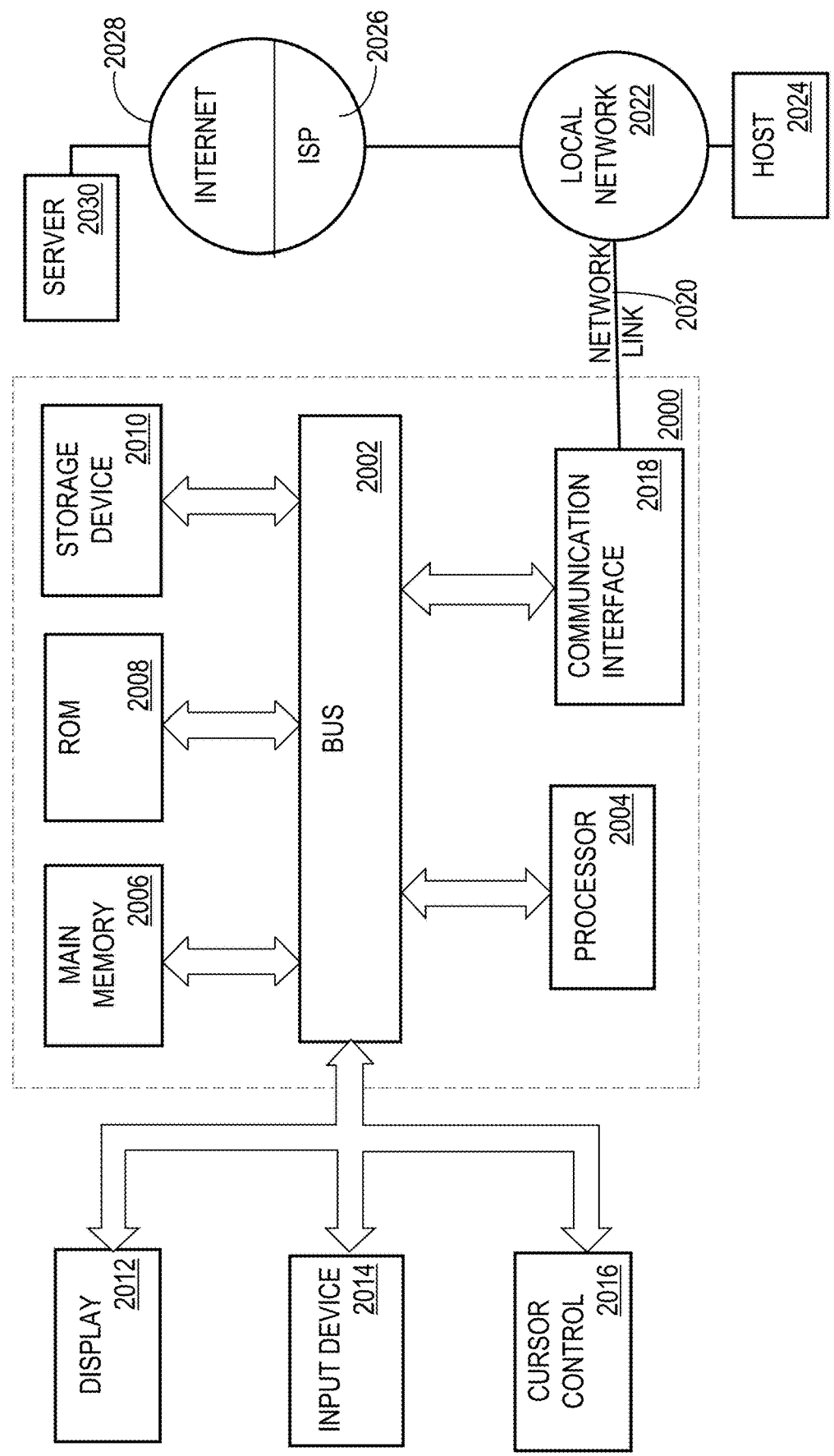
FIG. 20 illustrates a block diagram of a computing device in which the example embodiment(s) of the present invention may be embodiment.

For example, FIG. 20 is a block diagram that illustrates a computer system 2000 upon which an embodiment of the invention may be implemented. Computer system 2000 includes a bus 2002 or other communication mechanism for communicating information, and a hardware processor 2004 coupled with bus 2002 for processing information. Hardware processor 2004 may be, for example, a general purpose microprocessor.

Computer system 2000 also includes a main memory 2006, such as a random access memory (RAM) or other dynamic storage device, coupled to bus 2002 for storing information and instructions to be executed by processor 2004. Main memory 2006 also may be used for storing temporary variables or other intermediate information during execution of instructions to be executed by processor 2004. Such instructions, when stored in non-transitory storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk, optical disk, or solid-state drive is provided and coupled to bus 2002 for storing information and instructions.

Computer system 2000 may be coupled via bus 2002 to a display 2012, such as a cathode ray tube (CRT), for displaying information to a computer user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor 2004 executing one or more sequences of one or more instructions contained in main memory 2006. Such instructions may be read into main memory 2006 from another storage medium, such as storage device 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 2010. Volatile media includes dynamic memory, such as main memory 2006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid-state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code may be executed by processor 2004 as it is received, and/or stored in storage device 2010, or other non-volatile storage for later execution.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 21:
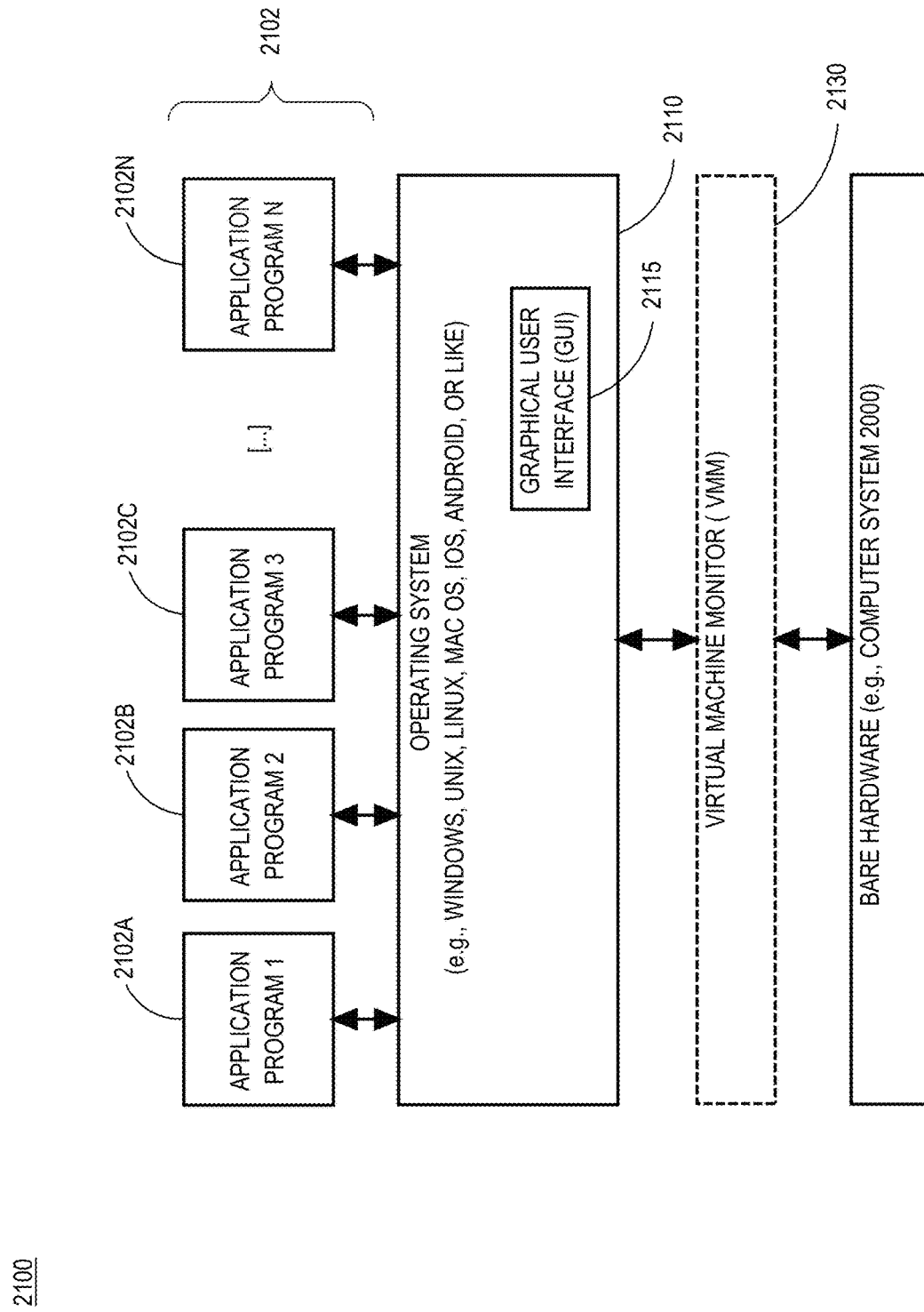
FIG. 21 illustrates a block diagram of a basic software system for controlling the operation of a computing device.

FIG. 21 is a block diagram of a basic software system 2100 that may be employed for controlling the operation of computing device 2000. Software system 2100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 2100 is provided for directing the operation of computing device 2000. Software system 2100, which may be stored in system memory (RAM) 2006 and on fixed storage (e.g., hard disk or flash memory) 2010, includes a kernel or operating system (OS) 2110.

The OS 2110 manages low-level aspects of computer operation, including managing execution of processes, memory allocation, file input and output (I/O), and device I/O. One or more application programs, represented as 2102A, 2102B, 2102C . . . 2102N, may be "loaded" (e.g., transferred from fixed storage 2010 into memory 2006) for execution by the system 2100. The applications or other software intended for use on device 2100 may also be stored as a set of downloadable computer-executable instructions, for example, for downloading and installation from an Internet location (e.g., a Web server, an app store, or other online service).

Software system 2100 includes a graphical user interface (GUI) 2115, for receiving user commands and data in a graphical (e.g., "point-and-click" or "touch gesture") fashion. These inputs, in turn, may be acted upon by the system 2100 in accordance with instructions from operating system 2110 and/or application(s) 2102. The GUI 2115 also serves to display the results of operation from the OS 2110 and application(s) 2102, whereupon the user may supply additional inputs or terminate the session (e.g., log off).

OS 2110 can execute directly on the bare hardware 2120 (e.g., processor(s) 2004) of device 2000. Alternatively, a hypervisor or virtual machine monitor (VMM) 2130 may be interposed between the bare hardware 2120 and the OS 2110. In this configuration, VMM 2130 acts as a software "cushion" or virtualization layer between the OS 2110 and the bare hardware 2120 of the device 2000.

VMM 2130 instantiates and runs one or more virtual machine instances ("guest machines"). Each guest machine comprises a "guest" operating system, such as OS 2110, and one or more applications, such as application(s) 2102, designed to execute on the guest operating system. The VMM 2130 presents the guest operating systems with a virtual operating platform and manages the execution of the guest operating systems.

In some instances, the VMM 2130 may allow a guest operating system to run as if it is running on the bare hardware 2120 of device 2000 directly. In these instances, the same version of the guest operating system configured to execute on the bare hardware 2120 directly may also execute on VMM 2130 without modification or reconfiguration. In other words, VMM 2130 may provide full hardware and CPU virtualization to a guest operating system in some instances.

In other instances, a guest operating system may be specially designed or configured to execute on VMM 2130 for efficiency. In these instances, the guest operating system is "aware" that it executes on a virtual machine monitor. In other words, VMM 2130 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
   evaluating a path pattern expression comprising an n-hop pattern for homomorphic matching against an in-memory graph representation, by at least executing a sequence of match operators that includes a root-vertex match (RNM) operator, an intermediate-neighbor match (NM) operator, and a leaf-neighbor match (LNM) operator, wherein executing said sequence of match operators includes:
   in response to said NM operator invoking said RNM operator, said RNM operator storing a first set of matching first-level vertices in a root-level data structure;
   in response to said LNM operator invoking said NM operator:
      said NM operator generating a first set of matching intermediate-neighbor vertices by accessing said root-level data structure to explore a particular chunk size of a particular first-level vertex in said first set of matching first-level vertices in said root-level data structure, wherein said particular chunk size specifies a finite plurality of neighbors of said particular first-level vertex to explore;
      said NM operator storing said first set of matching intermediate-neighbor vertices in an intermediate-level data structure;
   invoking said LNM operator, wherein in response to invoking said LNM operator:
      said LNM operator generating a first set of matching leaf-neighbor vertices by accessing said intermediate-level data structure;
      said LNM operator storing said first set of matching leaf-neighbor vertices in a leaf-level data structure.

2. The method of claim 1, further comprising generating at least part of a result for said path pattern expression based on said leaf-level data structure, said intermediate-level data structure, and said root-level data structure.

3. The method of claim 2, wherein said at least part of said result for said path pattern expression is generated when said leaf-level data structure is filled with data.

4. The method of claim 3, further comprising pipelining said result for said path pattern expression with one or more database relational operators.

5. The method of claim 1, further comprising in response to said NM operator generating said first set of matching intermediate-neighbor vertices by accessing said root-level data structure, said RNM operator updating data stored in said root-level data structure.

6. The method of claim 1, further comprising in response to said LNM operator generating said first set of matching leaf-neighbor vertices by accessing said intermediate-level data structure, said NM operator updating data stored in said intermediate-level data structure.

7. The method of claim 1, wherein said RNM operator is invoked by said NM operator in response to said NM operator being invoked.

8. The method of claim 1, wherein said NM operator is invoked by said LNM operator in response to said LNM operator being invoked.

9. The method of claim 1, wherein said LNM operator generating a first set of matching leaf-neighbor vertices by accessing said intermediate-level data structure comprises exploring a particular chunk size of a particular intermediate-neighbor vertex in said first set of matching intermediate-neighbor vertices in said intermediate-level data structure, wherein said particular chunk size specifies a number of neighbors of said particular intermediate-neighbor vertex to explore.

10. The method of claim 1, wherein said in-memory graph representation comprises a source data structure and a destination data structure, wherein each vertex of a graph is associated with a unique vertex identifier configured as an index in said source data structure, wherein each edge in said graph is associated with a unique edge identifier configured as an index in said destination data structure.

11. One or more non-transitory computer-readable storage media storing one or more sequences of program instructions which, when executed by one or more computing devices, cause:
evaluating a path pattern expression comprising an n-hop pattern for homomorphic matching against an in-memory graph representation, by at least executing a sequence of match operators that includes a root-vertex match (RNM) operator, an intermediate-neighbor match (NM) operator, and a leaf-neighbor match (LNM) operator, wherein executing said sequence of match operators includes:
in response to said NM operator invoking said RNM operator, said RNM operator storing a first set of matching first-level vertices in a root-level data structure;
in response to said LNM operator invoking said NM operator:
said NM operator generating a first set of matching intermediate-neighbor vertices by accessing said root-level data structure to explore a particular chunk size of a particular first-level vertex in said first set of matching first-level vertices in said root-level data structure, wherein said particular chunk size specifies a finite plurality of neighbors of said particular first-level vertex to explore;
said NM operator storing said first set of matching intermediate-neighbor vertices in an intermediate-level data structure;
invoking said LNM operator, wherein in response to invoking said LNM operator:
said LNM operator generating a first set of matching leaf-neighbor vertices by accessing said intermediate-level data structure;
said LNM operator storing said first set of matching leaf-neighbor vertices in a leaf-level data structure.

12. The one or more non-transitory computer-readable storage media of claim 11, wherein the one or more sequences of the program instructions which, when executed by the one or more computing devices, further cause generating at least part of a result for said path pattern expression based on said leaf-level data structure, said intermediate-level data structure, and said root-level data structure.

13. The one or more non-transitory computer-readable storage media of claim 12, wherein said at least part of said result for said path pattern expression is generated when said leaf-level data structure is filled with data.

14. The one or more non-transitory computer-readable storage media of claim 13, wherein the one or more sequences of the program instructions which, when executed by the one or more computing devices, further cause pipelining said result for said path pattern expression with one or more database relational operators.

15. The one or more non-transitory computer-readable storage media of claim 11, wherein the one or more sequences of the program instructions which, when executed by the one or more computing devices, further cause, in response to said NM operator generating said first set of matching intermediate-neighbor vertices by accessing said root-level data structure, said RNM operator updating data stored in said root-level data structure.

16. The one or more non-transitory computer-readable storage media of claim 11, wherein the one or more sequences of the program instructions which, when executed by the one or more computing devices, further cause, in response to said LNM operator generating said first set of matching leaf-neighbor vertices by accessing said intermediate-level data structure, said NM operator updating data stored in said intermediate-level data structure.

17. The one or more non-transitory computer-readable storage media of claim 11, wherein said RNM operator is invoked by said NM operator in response to said NM operator being invoked.

18. The one or more non-transitory computer-readable storage media of claim 11, wherein said NM operator is invoked by said LNM operator in response to said LNM operator being invoked.

19. The one or more non-transitory computer-readable storage media of claim 11, wherein said LNM operator generating a first set of matching leaf-neighbor vertices by accessing said intermediate-level data structure comprises exploring a particular chunk size of a particular intermediate-neighbor vertex in said first set of matching intermediate-neighbor vertices in said intermediate-level data structure, wherein said particular chunk size specifies a number of neighbors of said particular intermediate-neighbor vertex to explore.

20. The one or more non-transitory computer-readable storage media of claim 11, wherein said in-memory graph representation comprises a source data structure and a destination data structure, wherein each vertex of a graph is associated with a unique vertex identifier configured as an index in said source data structure, wherein each edge in said graph is associated with a unique edge identifier configured as an index in said destination data structure.

* * * * *

UNITED STATES PATENT AND TRADEMARK OFFICE
CERTIFICATE OF CORRECTION

| | |
|---|---|
| PATENT NO. | : 11,392,624 B2 |
| APPLICATION NO. | : 16/710740 |
| DATED | : July 19, 2022 |
| INVENTOR(S) | : Haprian et al. |

It is certified that error appears in the above-identified patent and that said Letters Patent is hereby corrected as shown below:

On the Title Page

On page 2, Column 1, under item [56] Other Publications, Line 6, delete ""Cachesensitive" and insert -- "Cache-sensitive --, therefor.

On page 2, Column 1, under item [56] Other Publications, Line 7, delete "Taversals" and insert -- Traversals --, therefor.

On page 2, Column 1, under item [56] Other Publications, Line 20, delete "Germlin Grpah" and insert -- Gremlin Graph --, therefor.

On page 2, Column 1, under item [56] Other Publications, Line 26, delete "Final" and insert -- Non-Final --, therefor.

On page 2, Column 2, under item [56] Other Publications, Line 12, delete "Endowmwnt," and insert -- Endowment, --, therefor.

On page 2, Column 2, under item [56] Other Publications, Line 44, delete "Operations" and insert -- Operators --, therefor.

On page 2, Column 2, under item [56] Other Publications, Line 50, delete "l" and insert -- 1 --, therefor.

In the Drawings

On sheet 14 of 25, in FIG. 10, under Reference Numeral 1005, Line 2, delete "( RNM)" and insert -- (RNM) --, therefor.

On sheet 14 of 25, in FIG. 10, under Reference Numeral 1005, Line 3, delete "( LNM)" and insert -- (LNM) --, therefor.

Signed and Sealed this
Third Day of January, 2023

Katherine Kelly Vidal
*Director of the United States Patent and Trademark Office*

On sheet 19 of 25, in FIG. 15, under Reference Numeral 1505, Line 2, delete "( RNM)" and insert -- (RNM) --, therefor.

On sheet 19 of 25, in FIG. 15, under Reference Numeral 1505, Line 3, delete "( LNM)" and insert -- (LNM) --, therefor.

On sheet 21 of 25, in FIG. 17, under Reference Numeral 1720, Line 3, delete "leaf- neighbor" and insert -- leaf-neighbor --, therefor.

On sheet 22 of 25, in FIG. 18, under Reference Numeral 1805, Line 2, delete "( RNM)" and insert -- (RNM) --, therefor.

On sheet 22 of 25, in FIG. 18, under Reference Numeral 1805, Line 3, delete "( LNM)" and insert -- (LNM) --, therefor.

On sheet 25 of 25, in FIG. 21, under Reference Numeral 2130, Line 1, delete "( VMM)" and insert -- (VMM) --, therefor.

In the Specification

In Column 2, Line 21, delete "breath" and insert -- breadth --, therefor.

In Column 3, Line 66, after "breadth-first" insert -- search --, therefor.

In Column 3, Line 66, after "depth-first" insert -- search --, therefor.

In Column 6, Line 52, delete "operators." and insert -- operators). --, therefor.

In Column 13, Line 30, delete "Heterogenous" and insert -- Heterogeneous --, therefor.

In Column 14, Line 32, delete "The" and insert -- the --, therefor.

In Column 21, Line 22, delete "Difference" and insert -- Differences --, therefor.

In Column 23, Line 17, delete "and or" and insert -- and/or --, therefor.